(12) United States Patent
Suzuki

(10) Patent No.: US 8,339,089 B2
(45) Date of Patent: Dec. 25, 2012

(54) POWER CONVERTER

(75) Inventor: Takashi Suzuki, Obu (JP)

(73) Assignee: Denso Corporation, Kariya (JP)

( * ) Notice: Subject to any disclaimer, the term of this patent is extended or adjusted under 35 U.S.C. 154(b) by 163 days.

(21) Appl. No.: 13/042,683

(22) Filed: Mar. 8, 2011

(65) Prior Publication Data

US 2011/0221375 A1    Sep. 15, 2011

(30) Foreign Application Priority Data

Mar. 10, 2010  (JP) ................................. 2010-053149

(51) Int. Cl.
*H02P 23/00* (2006.01)
(52) U.S. Cl. .................. 318/496; 318/254; 318/400.01; 318/400.3; 363/41; 363/98
(58) Field of Classification Search .................. 318/496, 318/254, 400.01, 400.3; 363/41, 98; 327/110
See application file for complete search history.

(56) References Cited

U.S. PATENT DOCUMENTS

| | | | |
|---|---|---|---|
| 6,593,781 B2 * | 7/2003 | Yoshimura | 327/110 |
| 6,842,354 B1 * | 1/2005 | Tallam et al. | 363/98 |
| 8,154,230 B2 * | 4/2012 | Kimura | 318/400.01 |
| 8,259,474 B2 * | 9/2012 | Blasko | 363/41 |
| 2003/0112040 A1 * | 6/2003 | Yoshimura | 327/110 |
| 2009/0200970 A1 * | 8/2009 | Kimura | 318/400.3 |
| 2011/0043273 A1 * | 2/2011 | Blasko | 327/489 |

FOREIGN PATENT DOCUMENTS

| | | |
|---|---|---|
| JP | 2001-197779 | 7/2001 |
| JP | 2004-120853 A | 4/2004 |
| JP | 2004-336921 A | 11/2004 |
| JP | P2004-336921 A | 11/2004 |
| JP | 2005-168140 A | 6/2005 |
| JP | P2005-168140 A | 6/2005 |
| JP | 2007-306705 | 11/2007 |
| JP | 2009-017671 A | 1/2009 |
| JP | P2009-017671 A | 1/2009 |

* cited by examiner

*Primary Examiner* — Paul Ip
(74) *Attorney, Agent, or Firm* — Nixon & Vanderhye PC

(57) ABSTRACT

In a power converter, a voltage command signal shifting part shifts a first duty command signal such that a first duty center value related to a voltage applied to a first set of windings is shifted downwards than an output center value of a possible duty range. The voltage command signal shifting part also shifts a second duty command signal such that a second duty center value related to a voltage applied to a second set of windings is shifted upwards than the output center value. First and second shift amounts of the first and second duty center values from the output center value are varied depending on amplitude. Accordingly, ripple current of a capacitor can be decreased, and a difference in heat loss between switching elements can be minimized.

16 Claims, 27 Drawing Sheets

FIG. 5

| VOLTAGE VECTOR | TURNED-ON FET | | |
|---|---|---|---|
| | U-PHASE | V-PHASE | W-PHASE |
| ZERO VOLTAGE — V0 | FET 24 | FET 25 | FET 26 |
| V1 | FET 21 | FET 25 | FET 26 |
| V2 | FET 21 | FET 22 | FET 26 |
| EFFECTIVE VOLTAGE — V3 | FET 24 | FET 22 | FET 26 |
| V4 | FET 24 | FET 22 | FET 23 |
| V5 | FET 24 | FET 25 | FET 23 |
| V6 | FET 21 | FET 25 | FET 23 |
| ZERO VOLTAGE — V7 | FET 21 | FET 22 | FET 23 |

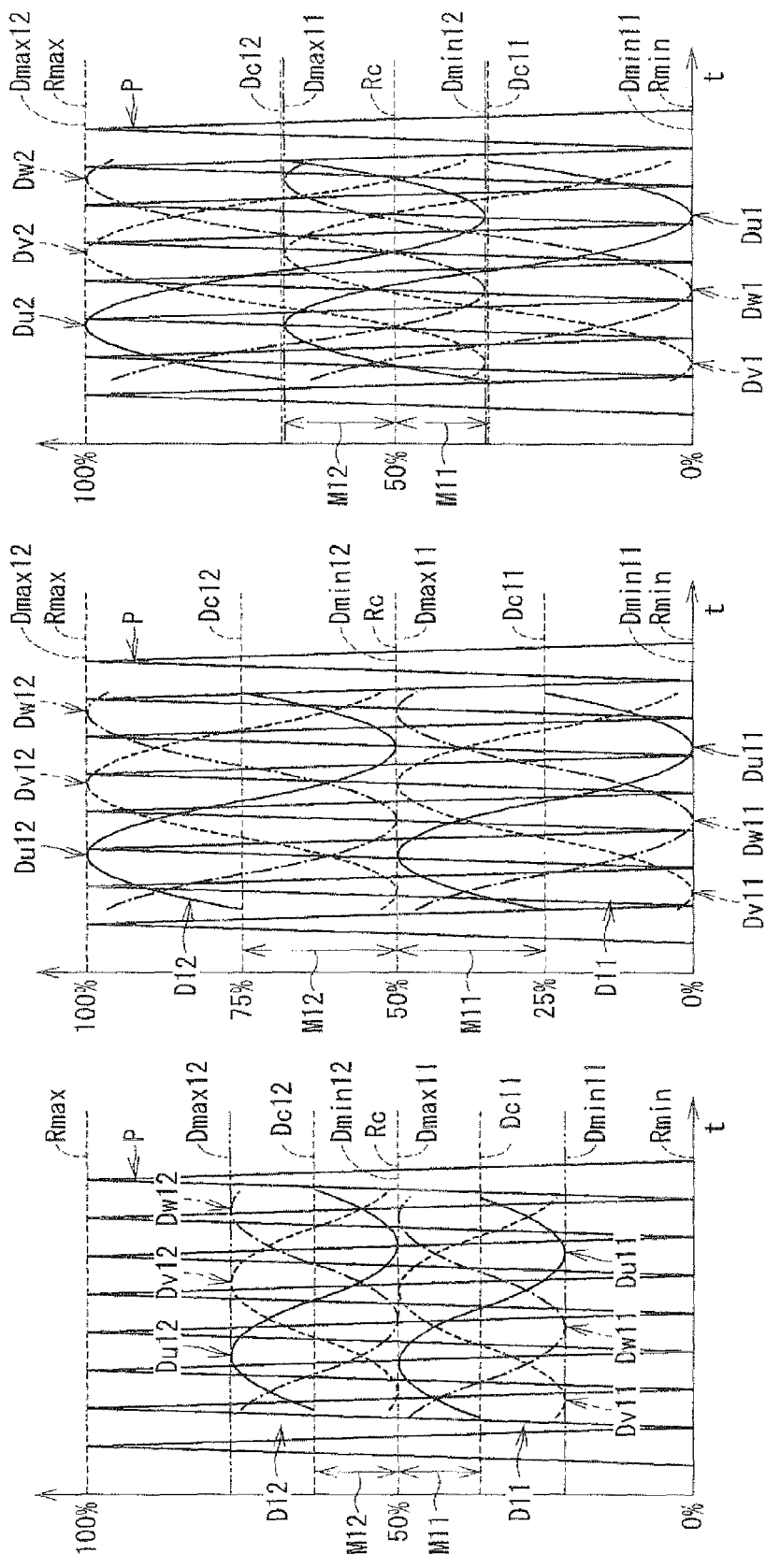

FIG. 12A U-PHASE CURRENT (U2 COIL) — D12: SHIFT (+), E2
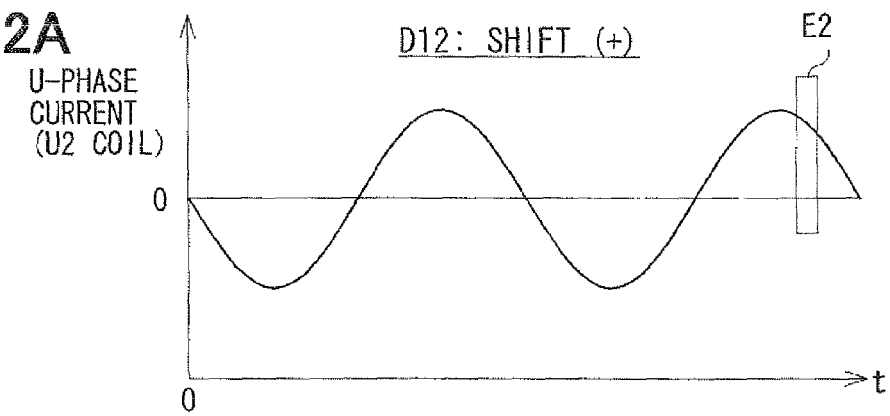
FIG. 12B U-PHASE CURRENT
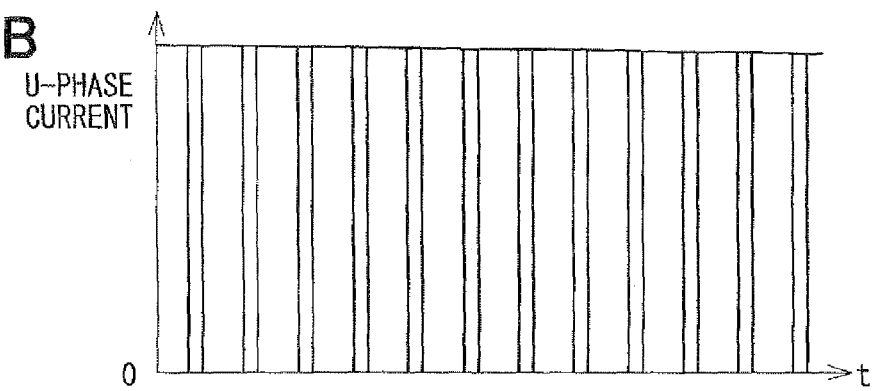
FIG. 12C L-FET CURRENT
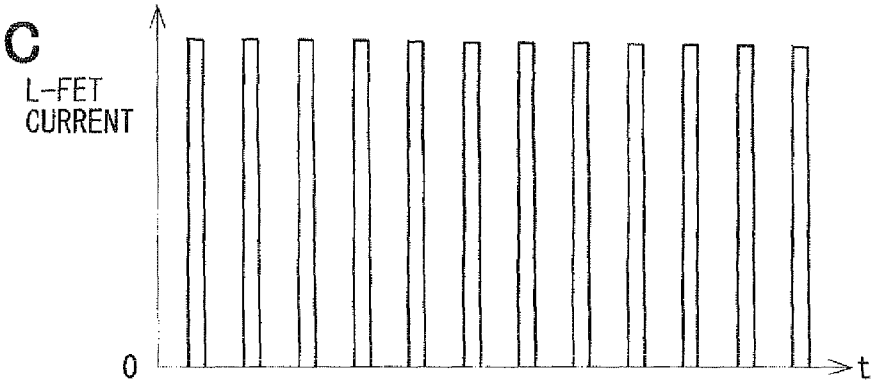
FIG. 12D H-FET CURRENT
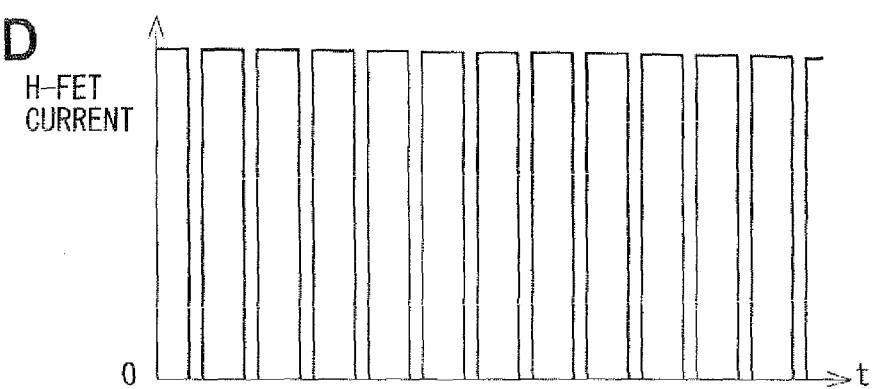

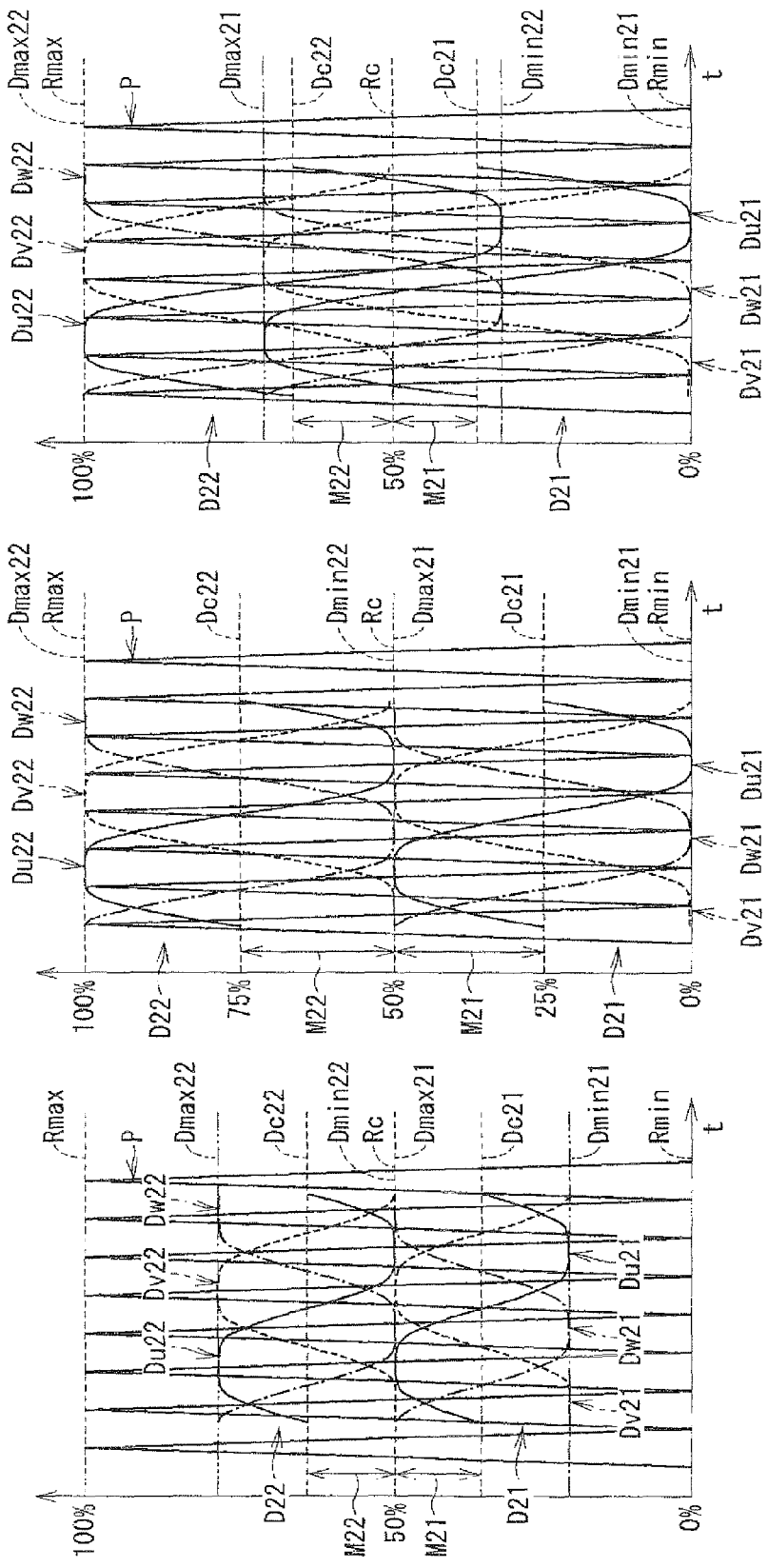

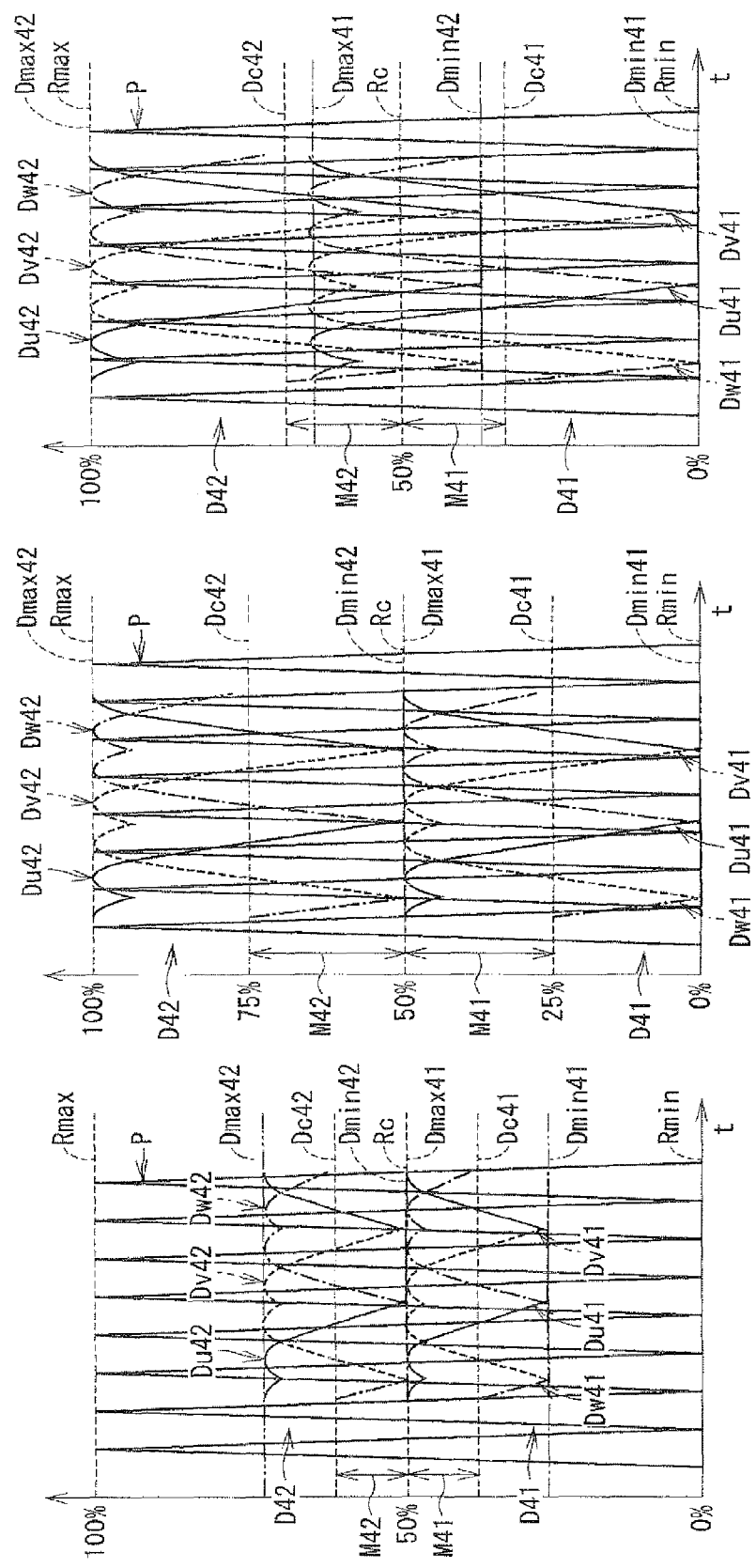

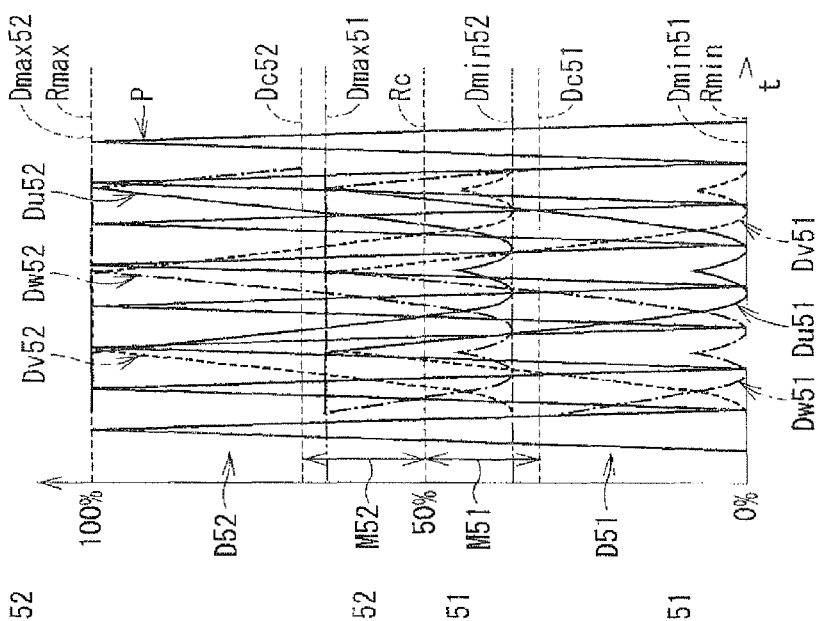
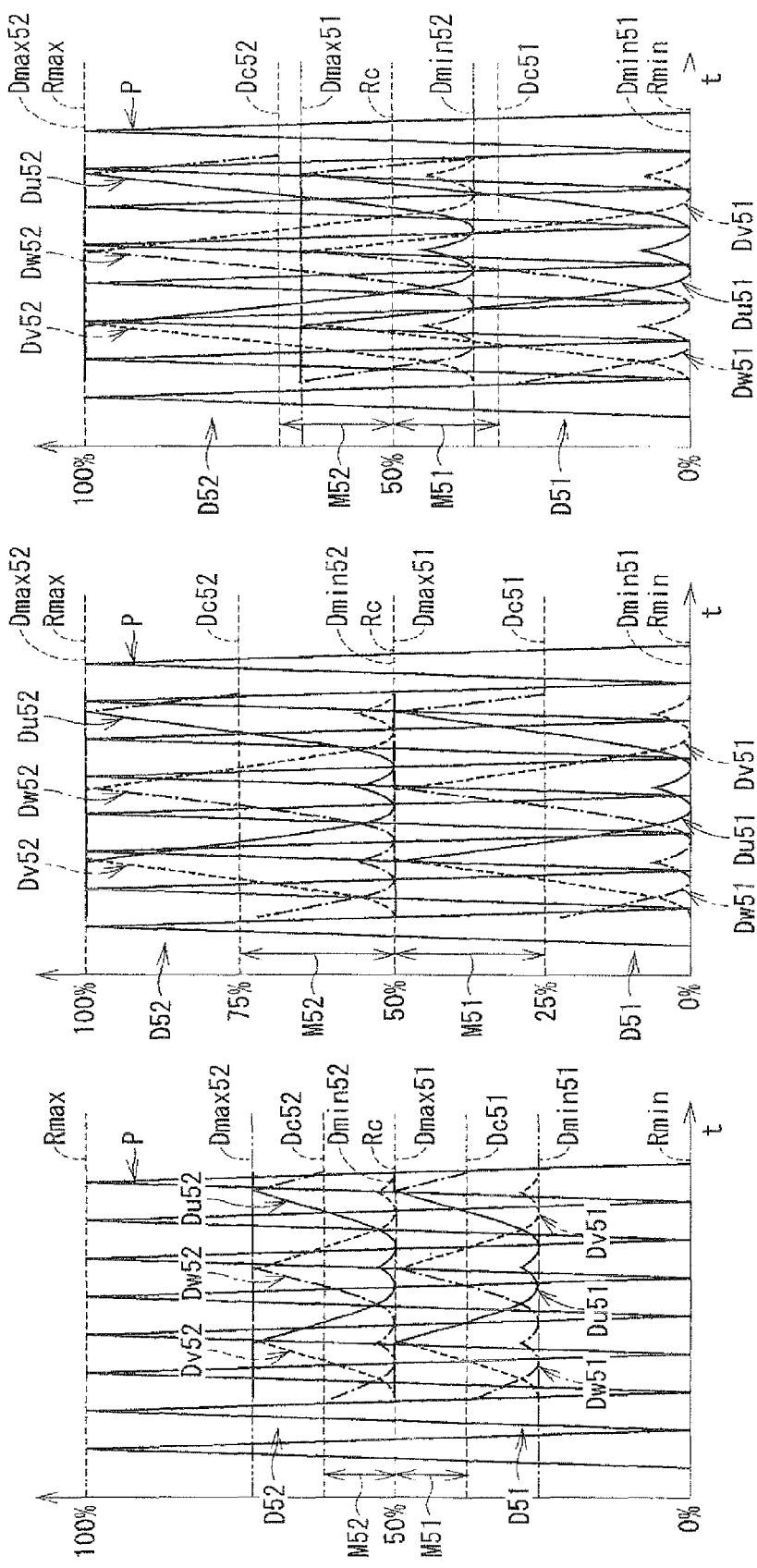
FIG. 21A  FIG. 21B  FIG. 21C

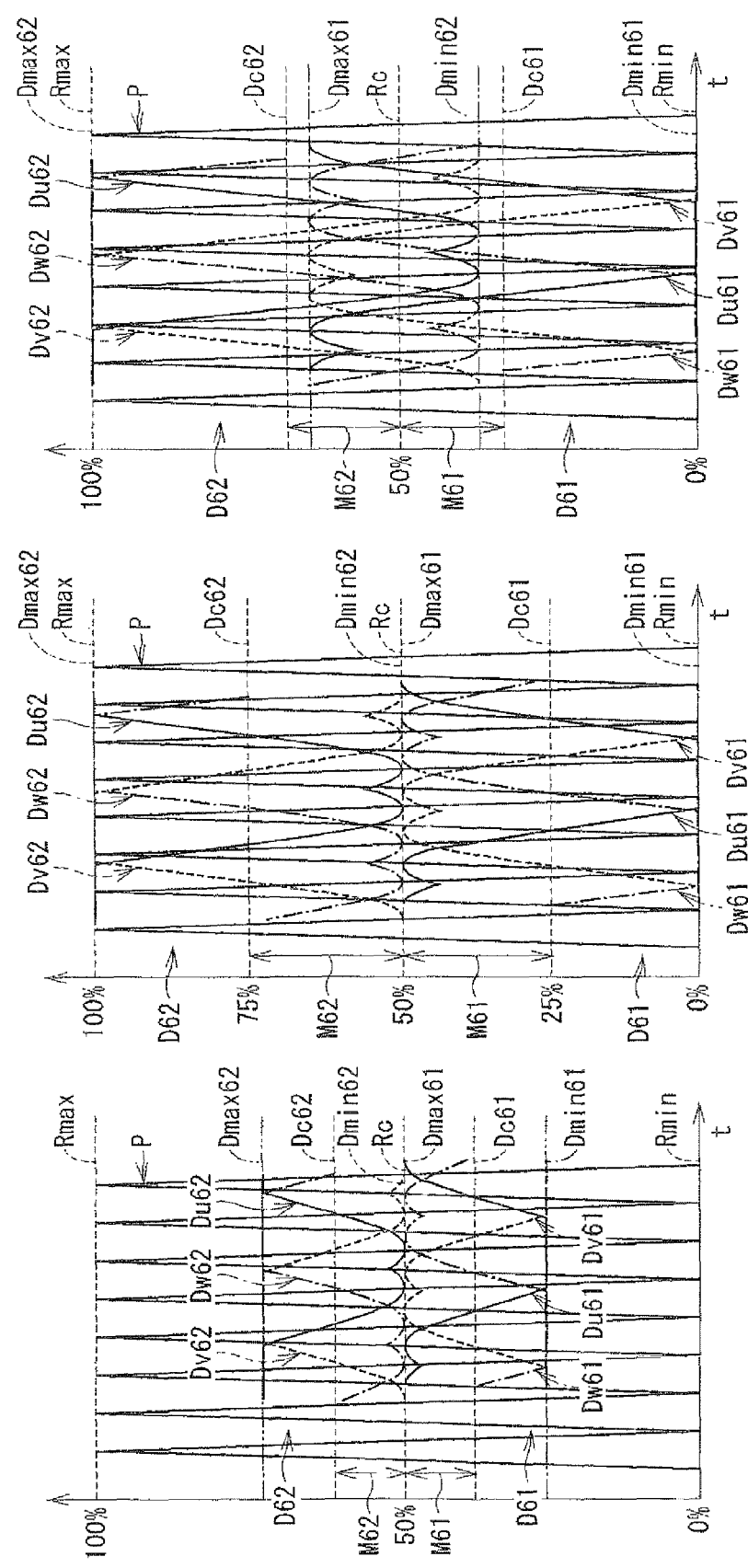

POWER CONVERTER

CROSS REFERENCE TO RELATED APPLICATION

This application is based on and incorporates herein by reference Japanese patent application No. 2010-53149 filed on Mar. 10, 2010.

FIELD OF THE INVENTION

The present invention relates to a power converter for a multiphase rotating electric machine.

BACKGROUND OF THE INVENTION

Techniques for controlling current to drive a multiphase rotating electric machine by part of pulse width modulation (PWM) have been known in the related art. For example, if the multiphase rotating electric machine is a three-phase motor, a PWM reference signal of a triangular wave or the like is compared with a voltage reference signal related to voltages applied respectively to its three-phase windings and current flowing through the three-phase motor is controlled by switching on and off switching elements of an inverter.

If the inverter is connected to a capacitor, when no current flow into the inverter, the capacitor is charged as current flows from a power supply source into the capacitor. On the other hand, when current flows into the inverter, the capacitor is discharged as current flows from the capacitor into the inverter. In PWM control, the capacitor alternates between charging and discharging during one cycle of PWM, capacitor current is pulsed. Pulsation of current flowing through the capacitor is referred to as ripple current. When the capacitor current is pulsed, noises are generated or the capacitor generates heat. In addition, fluctuation of a voltage applied to the inverter may result in poor controllability of inverter current.

For the purpose of avoiding the above problems, JP 2001-197779A discloses a technique in which a phase difference is imposed on switching timings of switching elements between two sets of bridge circuits, based on pre-stored map data, so that a waveform of summed capacitor current approaches a smooth waveform in order to decrease ripple current. In addition, JP 2007-306705A discloses a technique in which, if two axes are connected in a PWM amplifier, a voltage command for one axis is biased to Vcc/4 (Vcc being a power source voltage) while a voltage command for the other is biased to −Vcc/4 in order to decrease ripple current.

However, the technique disclosed in JP 2001-197779A requires a delay circuit since the phase difference is imposed on the switching timings based on a modulation ratio and a power factor. In addition, this technique requires detection of current in a plurality of lines at short intervals, which may result in heavy operation load of a control circuit.

In the technique disclosed in JP 2007-306705A, for example if two inverter systems are present, a voltage command is biased to a ¼ upper part of a power source voltage for one of the two inverter systems. When the command voltage is biased upwards (higher), time for which a switching element at a higher potential is in the on-state is longer than time for which a switching element at a lower potential is in the on-state. On the other hand, for the other inverter system, the voltage command is biased to a ¼ lower part of the power source voltage. When the command voltage is biased downwards (lower), time for which a switching element at a lower potential is in the on-state is longer than time for which a switching element at a higher potential is in the on-state. If an integrated value of current flowing through the switching elements at the higher potential is significantly different from an integrated value of current flowing through the switching elements at the lower potential, it may result in a difference in heat loss between the switching elements at the higher potential and the switching elements at the lower potential. Such a difference in heat loss between the switching elements at the higher potential and the switching elements at the lower potential requires a marginal thermal design or an asymmetrical heat radiation design. In addition, this difference in heat loss may require additional elements in the switching elements at the higher potential and the switching elements at the lower potential, which may result in cost-up.

SUMMARY OF THE INVENTION

It is an object of the invention to provide a power converter, which is capable of decreasing ripple current of a capacitor while suppressing a difference in heat loss between switching elements.

A power converter for a multiphase rotating electric machine includes two sets of windings. Each set is constituted by windings corresponding to each phase of the electric machine. The power converter includes tow inverter circuits, a capacitor and a control circuit. Each of the two inverter circuits has switching elements corresponding to each phase of the sets of windings. The capacitor is connected to the inverter circuits. The control circuit controls switching-on/off of the switching elements based on voltage command signals related to voltages applied to the sets of windings and a PWM reference signal. The control circuit further includes an amplitude calculating part and a shift amount calculating part. The amplitude calculating part calculates amplitudes of the voltage command signals. The shift amount calculating part calculates a first shift amount and a second shift amount. The first shift amount indicates a shift amount of a center value of a voltage command signal related to a voltage applied to one of the sets of windings from an output center value of a possible duty range to allow the center value of the voltage command signal to be shifted downwards than the output center value. The second shift amount indicates a shift amount of a center value of a voltage command signal related to a voltage applied to the other of the sets of windings from the output center value to allow the center value of the voltage command signal to be shifted upwards from the output center value. The first shift amount and the second shift amount are varied depending on the amplitudes calculated by the amplitude calculating part.

BRIEF DESCRIPTION OF THE DRAWINGS

The above and other objects, features and advantages of the present invention will become more apparent from the following detailed description made with reference to the accompanying drawings. In the drawings:

FIG. 5 is a table showing a voltage vector pattern created according to PWM control;

FIGS. 10A to 10C are time charts showing a duty command signal shift process according to the first embodiment of the present invention;

FIGS. 12A to 12D are time charts showing current flowing through a U2 coil in the duty command signal shift process according to the first embodiment of the present invention;

FIGS. 15A to 15C are time charts showing a duty command signal shift process according to the second embodiment of the present invention;

FIGS. 19A to 19C are time charts showing a duty command signal shift process according to the fourth embodiment of the present invention;

FIGS. 21A to 21C are time charts showing a duty command signal shift process according to the fifth embodiment of the present invention;

FIGS. 22A to 22C are time charts showing a duty command signal shift process according to a sixth embodiment of the present invention;

DETAILED DESCRIPTION OF THE PREFERRED EMBODIMENT

Figure 1:
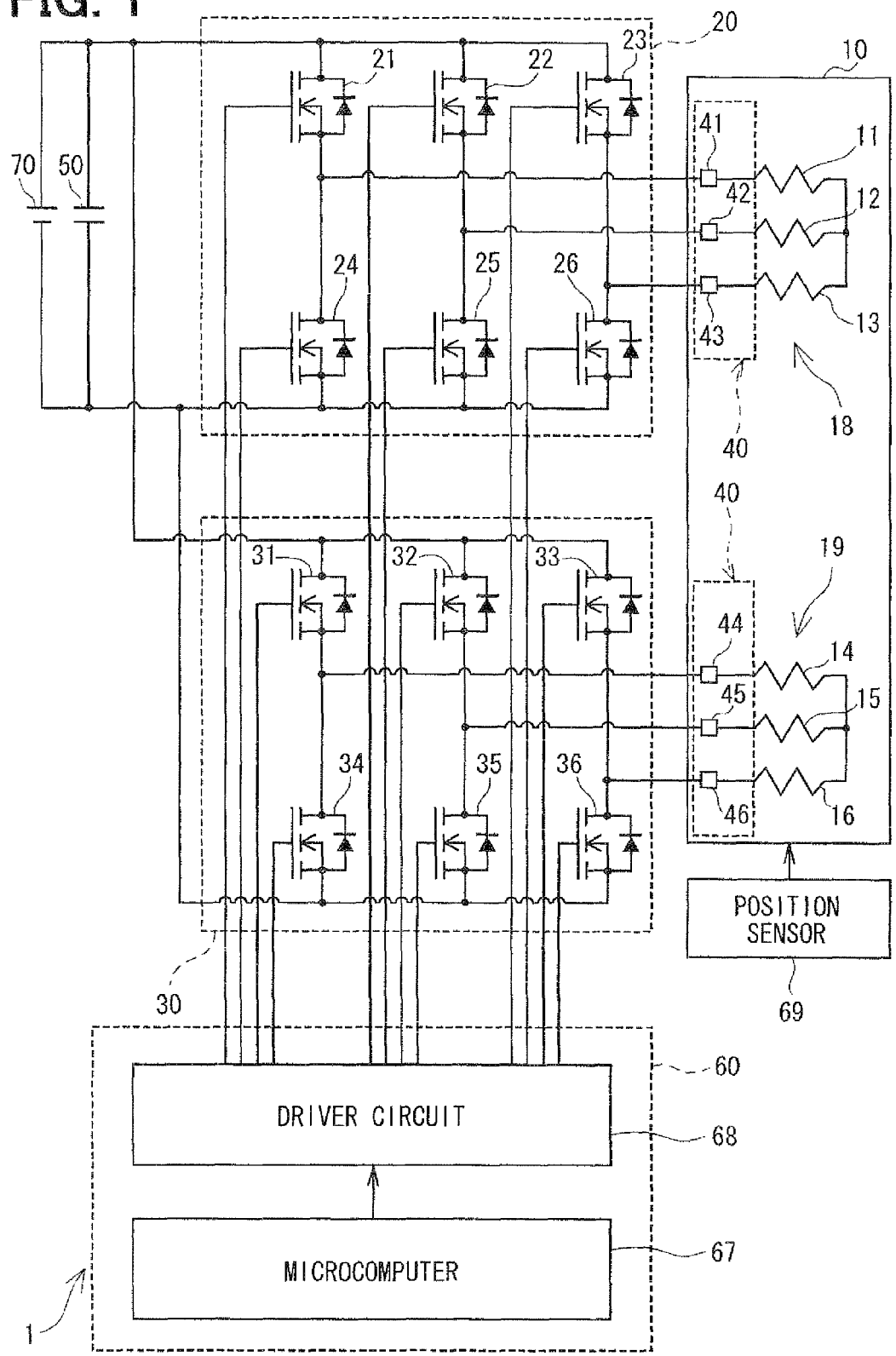
FIG. 1 is a schematic circuit diagram showing a power converter according to a first embodiment of the present invention.

Power converter according to exemplary embodiments will be described with reference to the accompanying drawings. In the following embodiments, the same or similar elements are denoted by the same reference numerals throughout the drawings.

First Embodiment

As shown in FIG. 1, a power converter 1 is provided to drive and control a motor 10, which is a multiphase rotating electric machine. For example, the power converter 1 is applied to an electric power steering system (EPS) for assisting in steering operation of a vehicle together with the motor 10.

The motor 10 is a three-phase brushless motor and has a rotor and a stator (both not shown). The rotor, which is a disc-like member, has a surface to which permanent magnets are attached, and has magnetic poles. The stator accommodates and rotatably supports the rotor. The stator has projections projecting inwardly in a radial direction at predetermined angle intervals, with the projections wound with a U1 coil 11, a V1 coil 12, a W1 coil 13, a U2 coil 14, a V2 coil 15 and a W2 coil 16. The U1 coil 11, the V1 coil 12 and the W1 coil 13 constitute a first set of windings 18. The U2 coil 14, the V2 coil 15 and the W2 coil 16 constitute a second set of windings 19. The first set of windings 18 and the second set of windings 19 thus provide two sets of windings. The motor 10 is provided with a position sensor 69, which detects a rotation position of the rotor.

The power converter 1 includes a first inverter circuit 20, a second inverter circuit 30, a current detector circuit 40, a capacitor 50, a control circuit 60, a battery 70, etc. In the first embodiment, the first inverter circuit 20 and the second inverter circuit 30 provide two inverters.

The first inverter circuit 20 is a three-phase inverter and includes six bridged switching elements 21 to 26 for switching electrical connection of the U1 coil 11, the V1 coil 12 and the W1 coil 13 in the first set of windings 18. The switching elements 21 to 26 are field effect transistors, particularly, metal-oxide-semiconductor field effect transistors (MOSFETs). The switching elements 21 to 26 are simply referred to as FETs 21-26.

Three FETs 21 to 23 have their respective drain electrodes connected to a positive pole of the battery 70. Source electrodes of the FETs 21 to 23 are respectively connected to drain electrodes of FETs 24 to 26. Source electrodes of the FETs 24 to 26 are connected to a negative pole of the battery 70.

A node between the FET 21 and FET 24 in pair is connected to one end of the U1 coil 11. A node between the FET 22 and FET 25 in pair is connected to one end of the V1 coil 12. A node between the FET 23 and FET 26 in pair is connected to one end of the W1 coil 13.

Like the first inverter circuit 20, the second inverter circuit 30 is a three-phase inverter and includes six bridged switching elements 31 to 36 for switching electrical connection of the U2 coil 14, the V2 coil 15 and the W2 coil 16 in the second set of windings 19. Like the switching elements 21 to 26, the switching elements 31 to 36 are FETs. The switching elements 31 to 36 are simply referred to as FETs 31-36.

Three FETs 31 to 33 have their respective drain electrodes connected to the positive pole of the battery 70. Source electrodes of the FETs 31 to 33 are respectively connected to drain electrodes of FETs 34 to 36. Source electrodes of the FETs 34 to 36 are connected to the negative pole of the battery 70.

A node between the FET 31 and FET 34 in pair is connected to one end of the U2 coil 14. A node between the FET 32 and FET 35 in pair is connected to one end of the V2 coil 15. A node between the FET 33 and FET 36 in pair is connected to one end of the W2 coil 16.

The FETs 21 to 23 and the FETs 31 to 33, which are switching elements at a higher potential side, are referred to as high-side FETs. The FETs 24 to 26 and the FETs 34 to 36, which are switching elements at a lower potential side, are referred to as low-side FETs. As necessary, a phase and an inverter circuit corresponding to a state termed U1 high-side FET 21 will be described together.

The current detector circuit 40 includes a U1 current detector 41, a V1 current detector 42, a W1 current detector 43, a U2 current detector 44, a V2 current detector 45 and a W2 current detector 46. The U1 current detector 41 is interposed between the node between the FET 21 and FET 24 and the U1 coil 11 and detects current flowing through the U1 coil 11. The V1 current detector 42 is interposed between the node between the FET 22 and FET 25 and the V1 coil 12 and detects current flowing through the V1 coil 12. The W1 current detector 43 is interposed between the node between the FET 23 and FET 26 and the W1 coil 13 and detects current flowing through the W1 coil 13. The U2 current detector 44 is interposed between the node between the FET 31 and FET 34 and the U2 coil 14 and detects current flowing through the U2 coil 14. The V2 current detector 45 is interposed between the node between the FET 32 and FET 35 and the V2 coil 15 and detects current flowing through the V2 coil 15. The W2 current detector 46 is interposed between the node between the FET 33 and FET 36 and the W2 coil 16 and detects current flowing through the W2 coil 16.

Each of the current detectors 41 to 46 is to detect a magnetic flux using a Hall element. A detected value of current detected by each of current detector 41 to 46 is analog-to-digital converted (AD value) and stored in a register constituting the control circuit 60. AD values are simultaneously acquired by the register from the current detectors 41 to 46. At the same time, a rotation position θ of the motor 10 detected by the position sensor 69 is acquired. In FIG. 1, control lines from the current detector circuit 40 and the position sensor 69 to the control circuit 60 are omitted for the purpose of simplicity and clarity.

The capacitor 50 is connected in parallel to the battery 70, the first inverter circuit 20 and the second inverter circuit 30 and accumulates electric charges to assist in supply of electric power to the FETs 21 to 26 and 31 to 36 or suppresses noise components such as surge current and the like.

Figure 2:
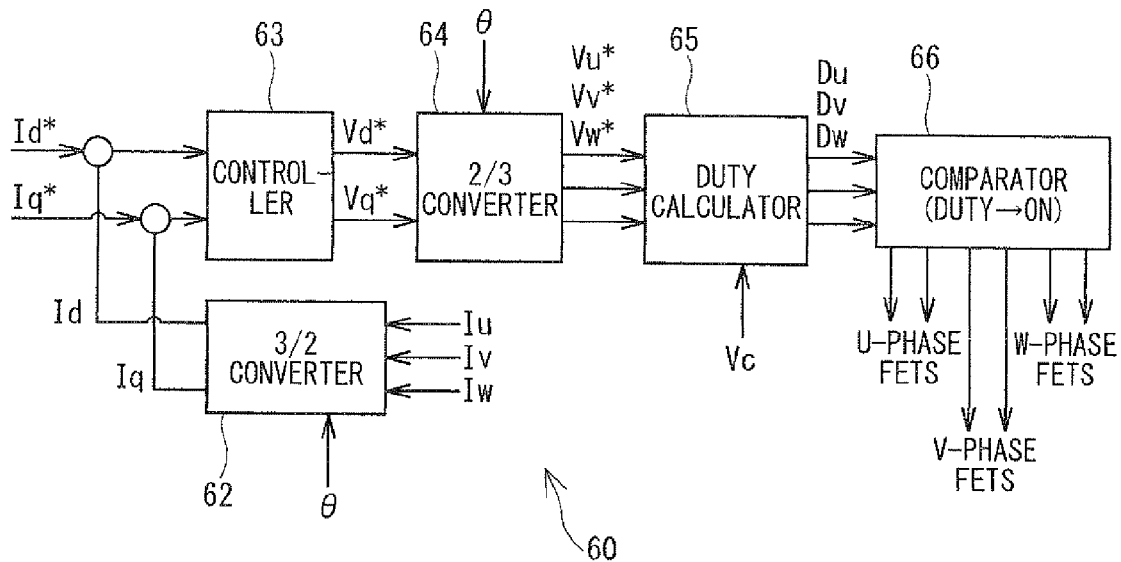
FIG. 2 is a block diagram showing a control circuit according to the first embodiment of the present invention.
Figure 3:
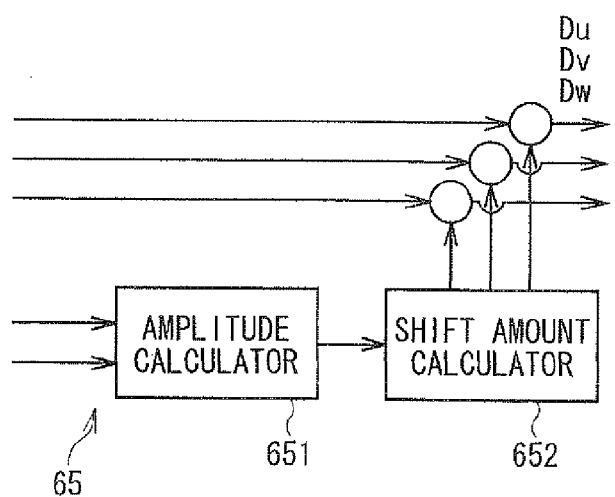
FIG. 3 is a circuit diagram showing a duty calculator according to the first embodiment of the present invention.

The control circuit 60 is configured to control the power converter 1 and includes a microcomputer 67, registers (not shown), a driver circuit 68 and so on. Details of the control circuit 60 are shown in FIGS. 2 and 3. As shown in FIG. 2, the control circuit 60 includes a three-phase to two-phase converter (3/2 converter) 62, a controller 63, a two-phase to three-phase converter (2/3 converter) 64, a duty calculator 65, a triangular wave comparator 66 and so on.

A control process of the control circuit 60 will be described briefly with reference to FIGS. 2 and 3. In the following description, it is assumed that phase duties of a first duty command signal D11 and a second duty command signal D12, which will be described later, are Du, Dv and Dw.

The three-phase to two-phase converter 62 reads AD values, which are detected by the current detectors 41 to 43 and stored in the registers, and calculates a current value Iu of the U1 coil 11, a current value Iv of the V1 coil 12 and a current value Iw of the W1 coil 13 based on the read AD values. In addition, the three-phase to two-phase converter 62 calculates a d-axis current detected value Id and a q-axis current detected value Iq based on the calculated three-phase current values Iu, Iv and Iw and the rotation position θ of the motor 10 detected by the position sensor 69.

The controller 63 performs a current feedback control operation to calculate a d-axis command voltage value Vd* and a q-axis command voltage value Vq* from a d-axis command current value Id* and a q-axis command current value Iq* and the d-axis current detected value Id and the q-axis current detected value Iq. More specifically, the controller 63 calculates a current deviation ΔId between the d-axis command current value Id* and the d-axis current detected value Id and a current deviation ΔIq between the q-axis command current value Iq* and the q-axis current detected value Iq and calculates the command voltages Vd* and Vq* to converge the current deviations ΔId and ΔIq to zero in order to follow the command current values Id* and Iq*.

The two-phase to three-phase converter 64 calculates three-phase command voltage values Vu*, Vv* and Vw* based on the command voltages Vd* and Vq* calculated by the controller 63 and the rotation position θ of the motor 10.

In the duty calculator 65, which is shown in FIG. 3, an amplitude calculator 651 calculates an amplitude of a command voltage and a shift amount calculator 652 calculates the amount of shift of the three-phase command voltage values based on the command voltage amplitude calculated by the amplitude calculator 651. The duty calculator 65 calculates a U-phase duty Du, a V-phase duty Dv and a W-phase duty Dw based on the three-phase command voltage values Vu*, Vv* and Vw*, the shift amount calculated by the shift amount calculator 652 and a capacitor voltage Vc, and then stores the calculated phase duties Du, Dv and Dw into registers. In addition, for the calculation of the phase duties Du, Dv and Dw, after converting the three-phase command voltage values Vu*, Vv* and Vw* into duties, the shift amount may be calculated or a neutral point voltage operation by a modulation process, which will be described later, may be performed, or after performing a neutral point voltage operation, the three-phase command voltage values Vu*, Vv* and Vw* may be converted into duties.

The triangular wave comparator 66 outputs on/off signals of the FETs 21 to 26 and 31 to 36 by comparing the PWM reference signal, which is a carrier signal of a triangular wave, with the phase duty signals (phase duties) Du, Dv and Dw. In this embodiment, the process of the triangular wave comparator 66 is performed in an electrical circuit within the microcomputer 67. This process may be performed by either software or hardware.

The amplitude calculator 651 corresponds to an amplitude calculating part and the shift amount calculator 652 corresponds to a shift amount calculating part. The three-phase command voltage values Vu*, Vv* and Vw* and phase duties Du, Dv and Dw calculated from three-phase command voltage values Vu*, Vv* and Vw* correspond to voltage command signals. In the following description, explanation about the conversion process of three-phase command voltage values Vu*, Vv* and Vw* into the phase duties Du, Dv and Dw will be omitted and the phase duties Du, Dv and Dw will be mainly described.

The first duty command signal D11 to drive the first inverter circuit 20 includes three sinusoidal wave signals; a U-phase duty Du11 regarding a voltage applied to the U1 coil 11, a V-phase duty Dv11 regarding a voltage applied to the V1 coil 12 and a W-phase duty Dw11 regarding a voltage applied to the W1 coil 13. The second duty command signal D12 to drive the second inverter circuit 30 includes three sinusoidal wave signals; a U-phase duty Du12 regarding a voltage applied to the U2 coil 14, a V-phase duty Dv12 regarding a voltage applied to the V2 coil 15 and a W-phase duty Dw12 regarding a voltage applied to the W2 coil 16 (see FIGS. 8A, 8B and FIGS. 10A to 10C, etc.).

Subsequently, PWM control will be described with an example where no neutral point voltage operation is performed in the first inverter circuit 20.

Figure 4A:
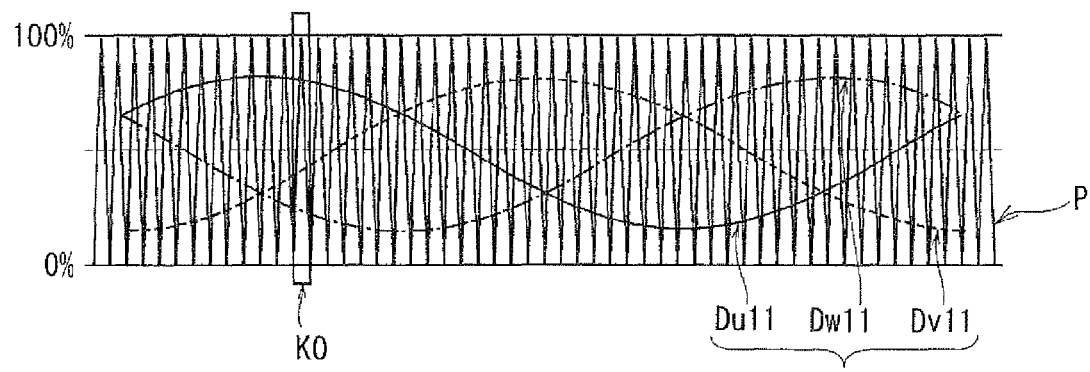
FIGS. 4A and 4B are time charts showing PWM control.

As shown in FIG. 4A, the PWM reference signal P is compared with the phase duties Du11, Dv11 and Dw11 to generate on/off signals of the FETs 21 to 26. In this embodiment, the high-side FETs 21 to 23 are in the off-state and the corresponding low-side FETs 24 to 26 are in the on-state in an interval where the PWM reference signal P is above (higher than) the phase duties Du11, Dv11 and Dw11. The high-side FETs 21 to 23 are in the on-state and the corresponding low-side FETs 24 to 26 are in the off-state in an interval where the PWM reference signal P is below (lower than) the phase duties Du11, Dv11 and Dw11. That is, the high-side FETs 21 to 23 and low-side FETs 24 to 26 in pair have a reverse on/off relationship.

More specifically, for example in an interval K1, the PWM reference signal P is located below the U-phase duty Du11 indicated by a solid line and is located above the V-phase duty Dv11 indicated by a dashed line and the W-phase duty Dw11 indicated by an alternate long and short dash line. Accordingly, for the U phase, the high-side FET 21 is in the on-state and the low-side FET 24 is in the off-state. For the V phase and the W phase, the high-side FETs 22 and 23 are in the off-state and the low-side FETs 25 and 26 are in the on-state.

A voltage vector pattern is a pattern indicating any three FETs, which are in the on-state, of six FETs 21 to 26. FIG. 5 shows voltage vector patterns V0 to V7. Specifically the low-side FETs 24 to 26 are all turned on for the voltage vector V0. The high-side FETs 21 to 23 are all turned on for the voltage vector V7. Accordingly, the voltage vectors V0 and V7 are zero voltage vectors, for which no voltage is applied to the first set of windings 18. On the other hand, the voltage vectors V1 to V6 are effective (valid) voltage vectors, for which a voltage is applied to the first set of windings 18.

The first duty command signal D11 for current flowing through the capacitor 50 while PWM control is being performed will be described by way of example with reference to FIGS. 6, 7A and 7B. The current detector circuit 40, the second inverter circuit 30 and so on are excluded from the circuit diagrams shown in FIGS. 7A and 7B for simplicity.

Figure 6:
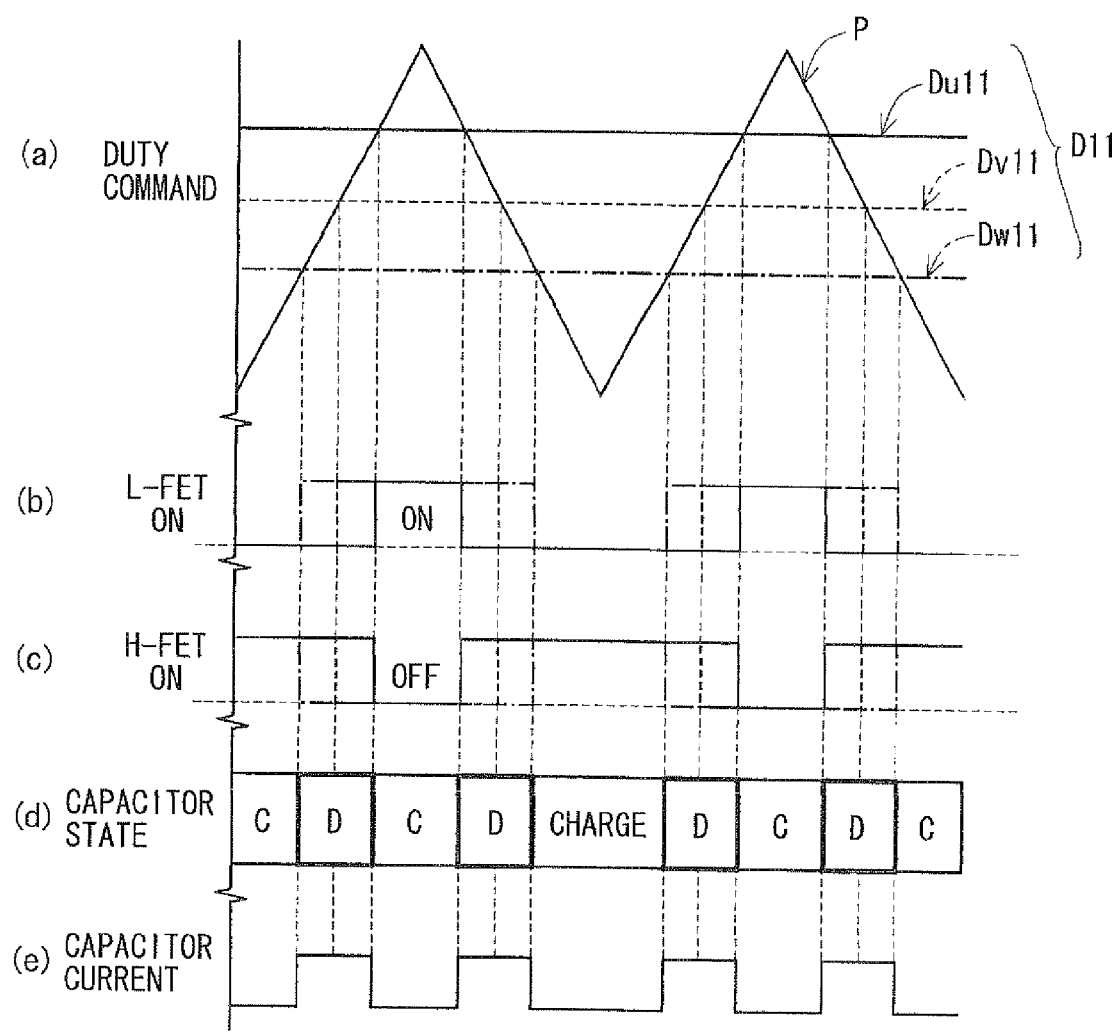
FIG. 6 is a time chart showing capacitor current in a case of PWM control.
Figure 7A:
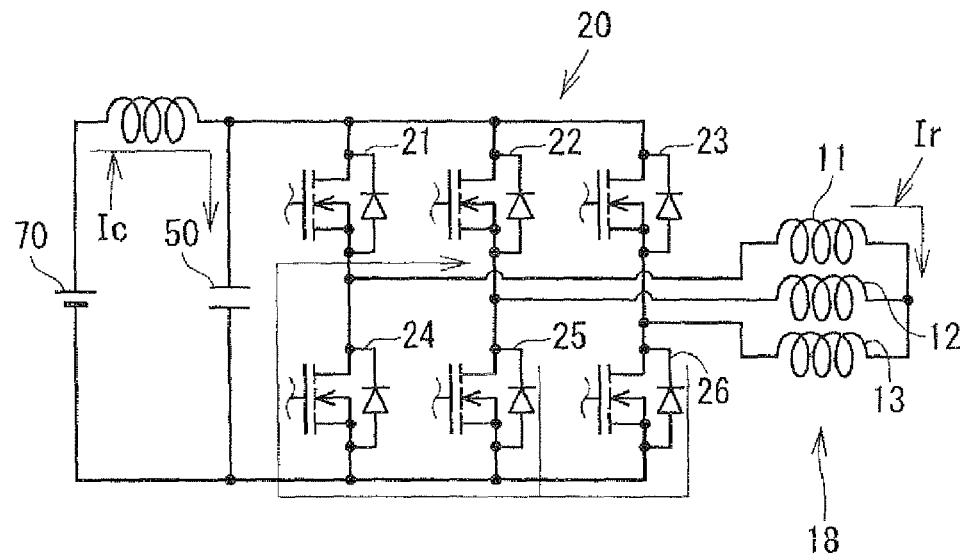
FIGS. 7A and 7B are circuit diagrams showing capacitor charging current and capacitor discharging current, respectively.
Figure 7B:
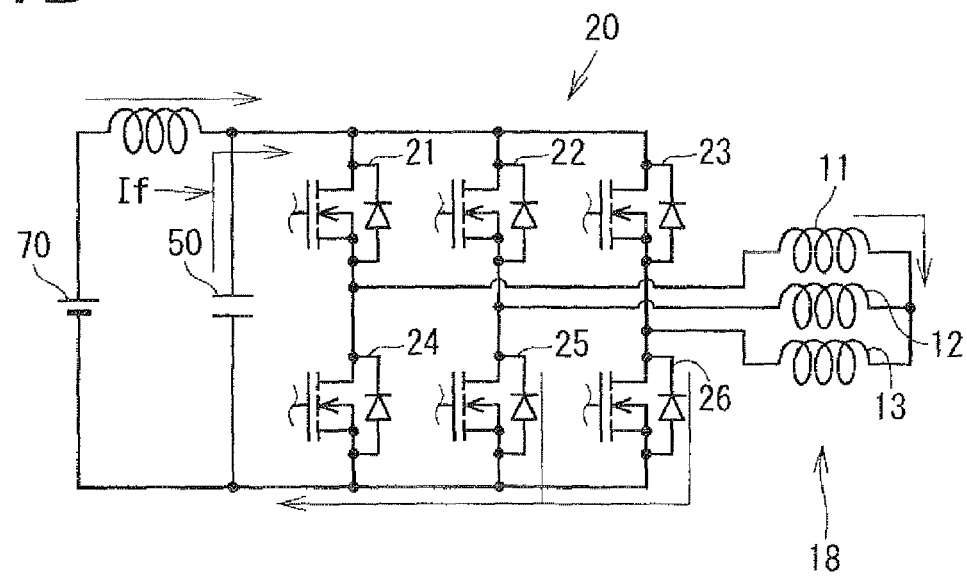

As shown in (a) to (c) of FIG. 6, when the PWM reference signal P is above the phase duties Du11, Dv11 and Dw11, the corresponding high-side FETs (H-FETs) 21 to 23 are in the off-state and the corresponding low-side FETs 24 to 26 are in the on-state. When the PWM reference signal P is below the phase duties Du11, Dv11 and DMA, the corresponding high-side FETs 21 to 23 are in the on-state and the corresponding low-side FETs 24 to 26 are in the off-state.

In a zero voltage vector where all of the high-side FETs 21 to 23 or all of the low-side FETs 24 to 26 are turned on, current flows from the battery 70 into the capacitor 50, which is thus charged. For example, as shown in FIG. 7A, when the low-side FETs 24 to 26 are in the on-state, the current from the battery 70 does not flow into the first inverter circuit 20 and regenerative current Ir flows into the first set of windings 18. In addition, the current from the battery 70 flows as charging current into the capacitor 50, which is thus charged, as indicated by a symbol Ic.

In an effective voltage vector where one or two of the high-side FETs 21 to 23 are in the on-state, current flows into the first inverter circuit 20 from the capacitor 50, which is thus discharged. For example, as shown in FIG. 76, when the high-side FET 21 and the low-side FETs 25 and 26 are in the on-state, the current from the battery 70 flows into the first inverter circuit 20. In addition, as indicated by a symbol If, discharge current flows into the first inverter circuit 20 from the capacitor 50 which is then discharged.

Returning to FIG. 6 where reference is made to a relationship between the PWM reference signal P, the first duty command signal D11 and a charging state (C) and a discharging state (D) of the capacitor 50, the capacitor 50 is charged in an interval where the PWM reference signal P is above or below the first duty command signals D11 of all phases. On the other hand, the capacitor 50 is discharged in an interval where the PWM reference signal P is in the first duty command signal D11. In the example shown in FIG. 6, the capacitor 50 is charged when the PWM reference signal P lies in a valley side or a mountain side, and the capacitor 50 is discharged when the PWM reference signal P lies therebetween. Accordingly, as shown in (d) of FIG. 6, the capacitor 50 alternates between charging (C) and discharging (D) in one cycle of PWM. This pulsates capacitor current, as shown in (e) of FIG. 6.

In the first embodiment, ripple current of the capacitor 50 is decreased by shifting the first duty command signal D11 regarding the voltage applied to the first set of windings 18 downwards (lower) from the center of possible duty range, which can be outputted, and shifting the second duty command signal D12 regarding the voltage applied to the second set of windings 19 upwards (higher) from the center of possible duty range, depending on the amplitude of the voltage command signal. The first duty command signal D11 corresponds to a lower-shifted voltage command signal and the second duty command signal D12 corresponds to a higher-shifted voltage command signal.

Figure 8A:
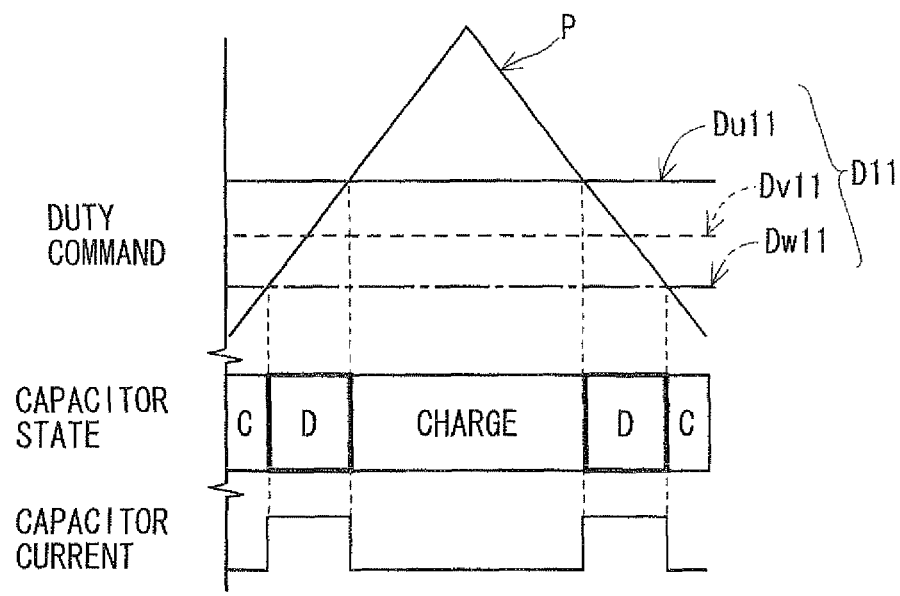
FIGS. 8A and 8B are time charts showing capacitor current in a case where a duty command signal is shifted.
Figure 8B:
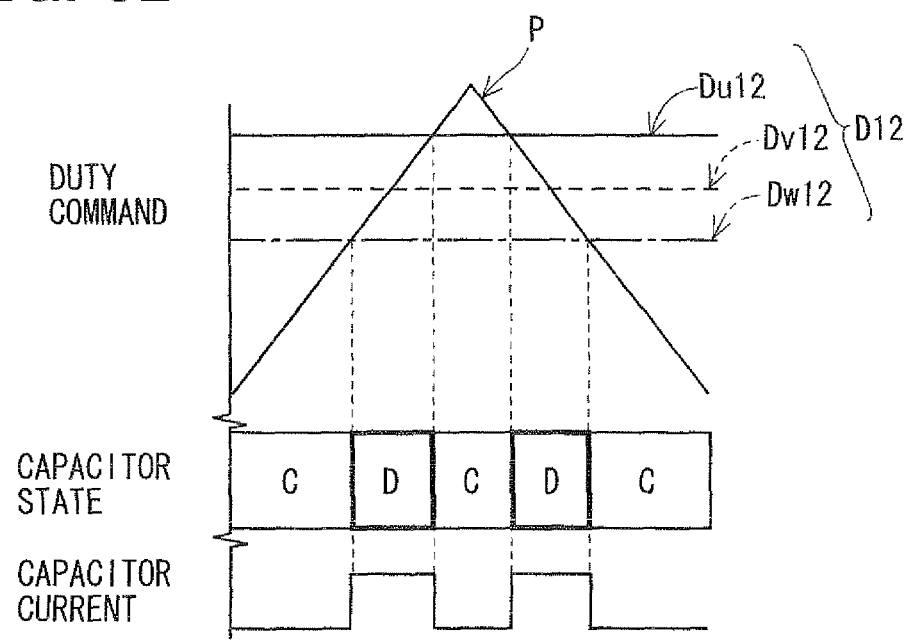

Capacitor current provided when the duty command signals D11 and D12 are respectively shifted upwards and downwards from an output center value $R_c$ (not shown in FIGS. 8A and 813, see FIGS. 10A to 10C) of an possible duty range will be described with reference to FIGS. 8A and 8B. FIG. 8A shows that the first duty command signal D11 is shifted downwards and FIG. 8B shows that the capacitor current obtained when the second duty command signal D12 is shifted upwards.

As shown in FIG. 8A, when the first duty command signal D11 is shifted downwards, charging time of the capacitor 50 at the mountain side of the PWM reference signal P is relatively long and discharging time of the capacitor 50 is biased to the valley side of the one PWM cycle. On the other hand, as shown in FIG. 8B, when the second duty command signal D12 is shifted upwards, charging time of the capacitor 50 at the mountain side of the PWM reference signal P is relatively short and discharging time of the capacitor 50 is relatively biased to the center of the one PWM cycle. The charging time at the valley side of the PWM reference signal is relatively long.

That is, when the duty command signal is shifted downwards and upwards, a generation timing of the effective voltage vector is different from that of the zero voltage vector. Accordingly, if the PWM reference signal P has no phase difference, ripple current of the capacitor 50 can be decreased by shifting the first duty command signal D11 downwards and shifting the second duty command signal D12 upwards. In addition, when amplitudes of the duty command signals D11 and D12 are small, if the first duty command signal D11 and the second duty command signal D12 are shifted without being overlapped, the capacitor 50 is charged in one inverter circuit while being discharged in the other inverter circuit.

In addition, even when the duty command signals D11 and D12 are shifted upwards and downwards from the center of the possible duty range, if a line voltage is not changed, the voltages applied to the sets of windings 18 and 19 are not changed.

However, if the center values of the duty command signals D11 and D12 are deviated from the output center value $R_c$, time for which the high-side FETs are in the on-state is different from time for which the low-side FETs are in the on-state.

Figure 9A:
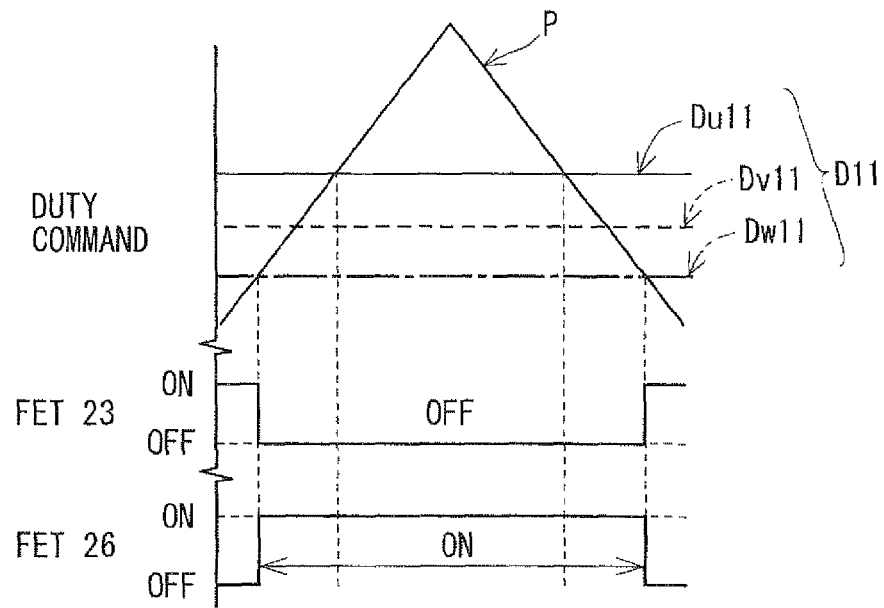
FIGS. 9A and 9B are time charts showing on/off time of switching elements in a case where a duty command signal is shifted.

As shown in FIG. 9A, when the first duty command signal D11 is shifted downwards, time for which the W1 low-side FET 26 is in the on-state is longer than time for which the W1 high-side FET 23 is in the on-state. This is equally applied to the U1 low-side FET 24 and U1 high-side FET 21, and the V1 low-side FET 25 and V1 high-side FET 22.

Figure 9B:
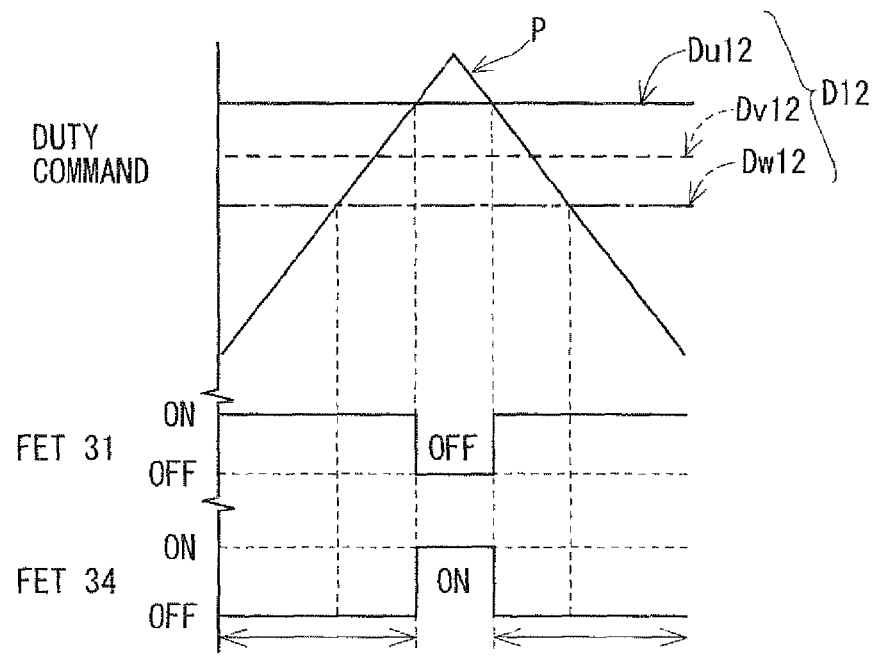

On the other hand, as shown in FIG. 9B when the second duty command signal D12 is shifted upwards, time for which the U2 high-side FET 31 is in the on-state is longer than time for which the U2 low-side FET 34 is in the on-state. This is equally applied to the V2 high-side FET 32 and V2 low-side FET 35, and the W2 high-side FET 33 and W2 low-side FET 36.

As the shift amount from the center of the possible duty range increases, a difference between the time for which the high-side FETs are in the on-state and the time for which the low-side FETs are in the on-state increases. Since an integrating current amount is changed if the time for which the high-side FETs are in the on-state is different from the time for which the paired low-side FETs are in the on-state, heat loss in the high-side FETs is different from heat loss in the low-side FETs.

In this embodiment, the ripple current of the capacitor 50 is decreased by shifting the first duty command signal D11 downwards and shifting the second duty command signal D12 upwards. In addition, a difference in heat loss between the FETs is suppressed to be small by varying the shift amounts of the first duty command signal D11 and the second duty command signal D12 depending on their amplitudes.

A voltage command signal is shifted as shown in FIGS. 10A, 10B and 10C.

In the first embodiment, the possible duty range is 0% to 100% of a power source voltage and the output center value $R_c$ of the possible duty range is 50% of the power source voltage. In addition, a voltage of the battery 70 is 12 V, the possible duty range is 0V to 12V in terms of a voltage, and the output center value R, corresponds to 6V. In addition, a frequency of the PWM reference signal P is 20 kHz. A PWM reference signal related to driving of the first inverter circuit 20 and a PWM reference signal P related to driving of the second inverter circuit 30 are the same triangular wave signals or triangular wave signals having the same phase. In addition, the first duty command signal D11 has the same amplitude as the second duty command signal D12.

As shown in FIG. 10A, if the amplitude of the first duty command signal D11 is equal to or less than 25% of the possible duty range, that is, if the minimum value $D_{min}11$ of the first duty command signal D11 when a first duty center value $D_c11$ of the first duty command signal D11 is shifted downwards such that the maximum value $D_{max}11$ of the first duty command signal D11 corresponds to the output center value $R_c$ is equal to or more than the lower limit $R_{min}$ of the possible duty range, the first duty center value $D_c11$ of the first duty command signal D11 is shifted downwards from the output center value $R_c$ such that the maximum value $D_{max}11$ corresponds to the output center value $R_c$.

On the other hand, if the amplitude of the second duty command signal D12 is equal to or less than 25% of the possible duty range, that is, if the maximum value $D_{max}12$ of the second duty command signal D12 when a second duty center value $D_c12$ of the second duty command signal D12 is shifted upwards such that the minimum value $D_{min}12$ of the second duty command signal D12 corresponds to the output center value $R_c$ is equal to or less than the upper limit $R_{max}$ of the possible duty range, the second duty center value $D_c12$ of the second duty command signal D12 is shifted upwards from the output center value $R_c$ such that the minimum value $D_{min}12$ corresponds to the output center value $R_c$.

As shown in FIG. 10B, if the amplitude of each of the first duty command signal D11 and second duty command signal D12 is 25% of the possible duty range, when the first duty center value $D_c11$ is shifted downwards such that the maximum value $D_{max}11$ of the first duty command signal D11 corresponds to the output center value K, the minimum value $D_{min}11$ of the first duty command signal D11 corresponds to the lower limit $R_{min}$ of the possible duty range. At this time, the first duty center value $D_c11$ is shifted downwards by 25% of the possible duty range with respect to the output center value K. That is, the first duty center value $D_c11$ at this point is $R_c-25=25\%$.

In addition, when the second duty center value $D_c12$ is shifted upwards such that the minimum value $D_{min}12$ of the second duty command signal D12 corresponds to the output center value K, the maximum value $D_{max}12$ of the second duty command signal D12 corresponds to the upper limit $R_{max}$ of the possible duty range. At this time, the second duty center value $D_c12$ is shifted upwards by 25% of the possible duty range with respect to the output center value $R_c$. That is, the second duty center value $D_c12$ at this point is $R_c+25=75\%$.

As shown in FIG. 10C, if the amplitude of the first duty command signal D11 is more than 25% of the possible duty range, when the first duty center value $D_c11$ is shifted downwards such that the maximum value $D_{max}11$ of the first duty command signal D11 corresponds to the output center value K, the minimum value $D_{min}11$ of the first duty command signal D11 is smaller than the lower limit $R_{min}$ of the possible duty range. If the first duty command signal D11 is beyond the possible duty range, an output voltage is distorted. Accordingly, if the amplitude of the first duty command signal D11 is more than 25% of the possible duty range, that is, if the minimum value $D_{min}11$ of the first duty command signal D11 when the center value $D_c11$ of the first duty command signal D11 is shifted such that the maximum value $D_{max}11$ of the first duty command signal D11 corresponds to the output center value $R_c$ is smaller than the lower limit $R_{min}$ of the possible duty range, the first duty center value $D_c11$ is shifted such that the minimum value $D_{min}11$ of the first duty command signal D11 corresponds to the lower limit $R_{min}$, of the possible duty range.

In addition, if the amplitude of the second duty command signal D12 is more than 25% of the possible duty range, when the second duty center value $D_c12$ is shifted upwards such that the minimum value $D_{min}12$ of the second duty command signal D12 corresponds to the output center value $R_c$, the maximum value $D_{max}12$ of the second duty command signal D12 is larger than the upper limit $R_{max}$ of the possible duty range. If the second duty command signal D12 is beyond the possible duty range, an output voltage is distorted. Accordingly, if the amplitude of the second duty command signal D12 is more than 25% of the possible duty range, that is, if the maximum value $D_{max}12$ of the second duty command signal D12 when the center value $D_c12$ of the second duty command signal D12 is shifted such that the minimum value $D_{min}12$ of the second duty command signal D12 corresponds to the output center value $R_c$ is larger than the upper limit $R_{max}$ of the possible duty range, the second duty center value $D_c12$ is shifted such that the maximum value $D_{max}12$ of the second duty command signal D12 corresponds to the upper limit $R_{max}$ of the possible duty range.

If the amplitude of the first duty command signal D11 is equal to or less than 25% of the possible duty range, the first duty center value $D_c11$ is shifted downwards to be distant from the output center value $R_c$ as the amplitude increases. In addition, if the amplitude of the first duty command signal D11 is more than 25% of the possible duty range, the first duty center value $D_c11$ is shifted in a direction to be close to the output center value $R_c$ from the first duty center value $D_c11$ when the amplitude of the first duty command signal D11 is 25% of the possible duty rage as the amplitude increases.

If the amplitude of the second duty command signal D12 is equal to or less than 25% of the possible duty range, the second duty center value $D_c12$ is shifted upwards to be distant from the output center value $R_c$ as the amplitude increases. In addition, if the amplitude of the second duty command signal D12 is more than 25% of the possible duty range, the second duty center value $D_c12$ is shifted in a direction to be close to the output center value $R_c$ from the second duty center value $D_c12$ when the amplitude of the second duty command signal D12 is 25% of the possible duty range as the amplitude increases.

That is, in the first embodiment, the shift amount (denoted by a symbol "M11" in FIGS. 10A to 10C) of the first duty center value $D_c11$ and the shift amount (denoted by a symbol "M12" in FIGS. 10A to 10C) of the second duty center value $D_c12$ can be varied depending on the amplitude of each of the duty command signals D11 and D12. This configuration is particularly effective when the amplitude of each of the duty command signals D11 and D12 is equal to or smaller than 25% of the possible duty range.

Here, it is assumed that the amplitude of each of the duty command signals D11 and 012 is 12.5% and a frequency of the PWM reference signal P is 20 kHz.

The first duty center value $D_c11$ of the first duty command signal D11 having the amplitude of 12.5% is shifted downwards from the output center value $R_c$ by 12.5% such that the maximum value $D_{max}11$ corresponds to the output center value $R_c$. In addition, the second duty center value $D_c12$ of the second duty command signal D12 having the amplitude of 12.5% is shifted upwards from the output center value $R_c$ by 12.5% such that the minimum value $D_{min}12$ corresponds to the output center value $R_c$.

Here, current flowing through the U1 coil 11 is shown in FIGS. 11A to 11D and current flowing through the U2 coil 14 is shown in FIGS. 12A to 12D.

Figure 11A:
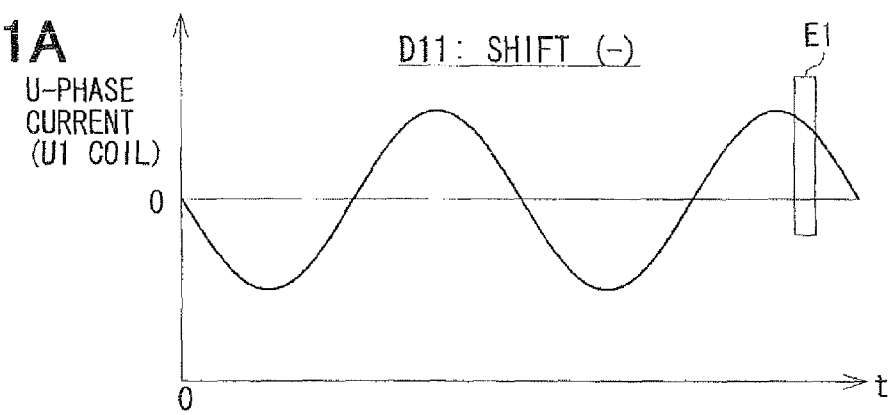
FIGS. 11A to 11D are time charts showing current flowing through a U1 coil in the duty command signal shift process according to the first embodiment of the present invention.

As shown in FIG. 11A, according to the PWM control based on the first duty command signal D11 and the PWM reference signal P, current Iu1 flowing through the U1 coil 11 may have substantially a sinusoidal wave. In addition, since a line voltage is not changed even when the first duty command signal D11 is shifted from the output center value k, the current flowing through the U1 coil 11 corresponds substantially to U-phase current when a duty command signal is not shifted as illustrated in a first reference example shown in FIG. 26A.

Figure 11B:
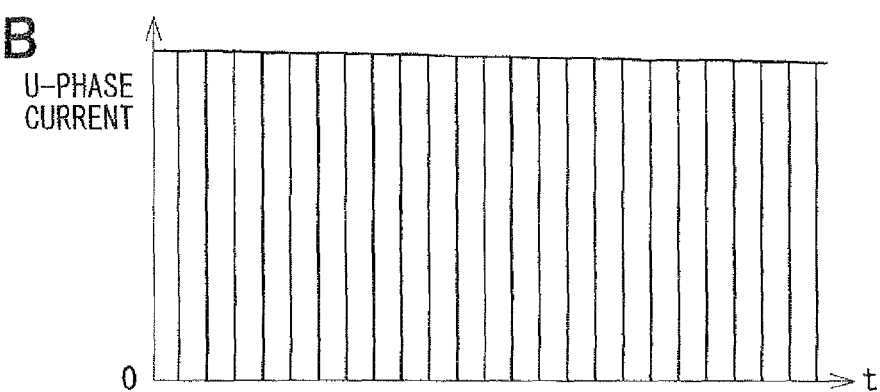
Figure 11C:
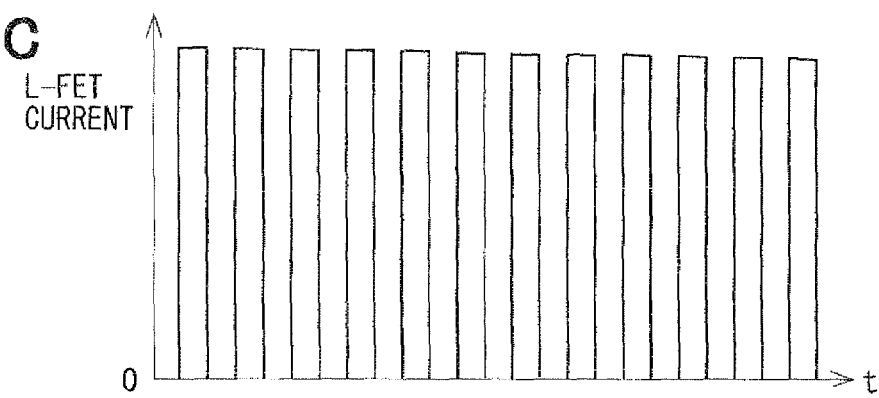
Figure 11D:
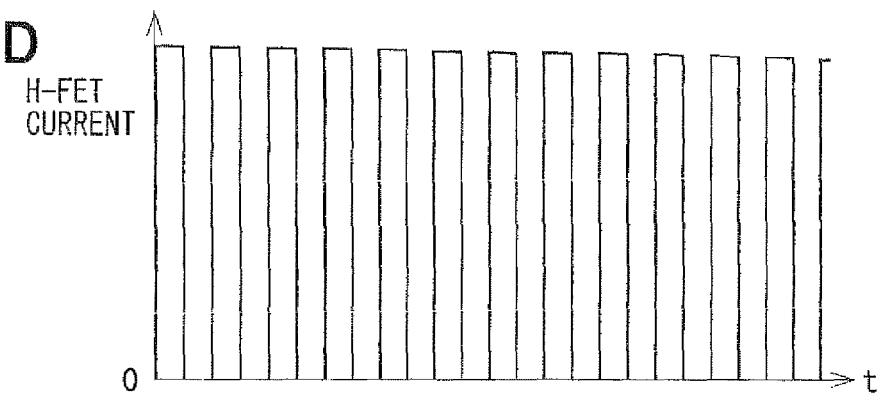

Details of an area denoted by a symbol E1 in FIG. 11A is shown in FIGS. 11B to 11D. The sinusoidal U-phase current shown in FIG. 11A is created from a continuous rectangular wave as shown in FIG. 11B. The rectangular wave shown in FIG. 116 is a combination of current flowing through the U1 low-side FET (L-FET) 24 as shown in FIG. 11C, and current flowing through the U1 high-side FET (H-FET) 21 as shown in FIG. 11D.

In the first embodiment, since the first duty command signal D11 is shifted downwards, in the first inverter circuit 20, the low-side FETs 24 to 26 have longer electrical conduction times and larger integrated current values than those of the high-side FETs 21 to 23. Specifically, for one cycle of electrical angle, an integrated current value of the U1 high-side FET 21 is 293.5 mA·sec and an integrated current value of the U1 low-side FET 24 is 484.7 mA·sec. In addition, an integrated current value of the V1 high-side FET 22 and an integrated current value of the W1 high-side FET 23 are about equal to the integrated current value of the U1 high-side FET 21 and an integrated current value of the V1 low-side FET 25 and an integrated current value of the W1 low-side FET 26 are about equal to the integrated current value of the U1 low-side FET 24.

Figure 26A:
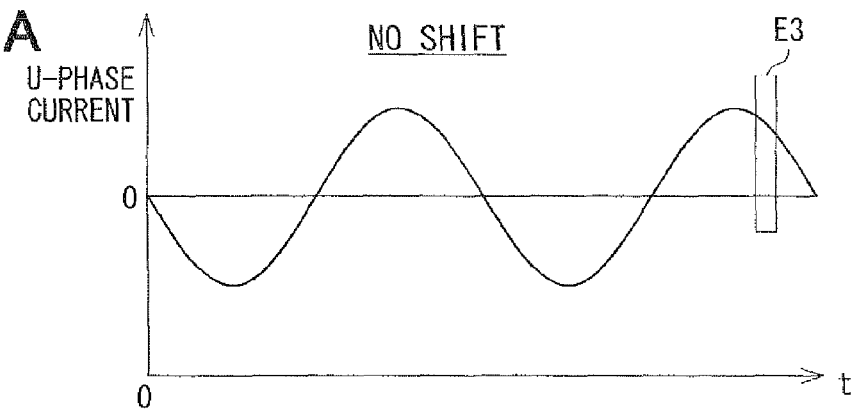
FIGS. 26A to 26D are time charts showing U-phase current in a first reference example.

As shown in FIG. 12A, according to the PWM control based on the second duty command signal D12 and the PWM reference signal P, current flowing through the U2 coil 14 have substantially a sinusoidal wave. In addition, since a line voltage is not changed even when the second duty command signal D12 is shifted from the output center value $R_c$, the current flowing through the U2 coil 14 corresponds substantially to U-phase current when the duty command signal is not shifted as illustrated in FIG. 26A.

Details of an area denoted by a symbol E2 in FIG. 12A is shown in FIG. 126. Current flowing through the U2 low-side FET 34 is shown in FIG. 12C, and current flowing through the U2 high-side FET 31 is shown in FIG. 12D.

In the first embodiment, since the second duty command signal D12 is shifted upwards, in the second inverter circuit 30, the high-side FETs 31 to 33 have longer electrical conduction times and larger integrated current values than those of the low-side FETs 34 to 36. Specifically, for one cycle of electrical angle, an integrated current value of the U2 high-side FET 31 is 485.2 mA·sec and an integrated current value of the U2 low-side FET 34 is 293.1 mA·sec. In addition, an integrated current value of the V2 high-side FET 32 and an integrated current value of the W2 high-side FET 33 are about equal to the integrated current value of the U2 high-side FET 31 and an integrated current value of the V2 low-side FET 35 and an integrated current value of the W2 low-side FET 36 are about equal to the integrated current value of the U2 low-side FET 34.

Here, U-phase current in reference examples will be described with reference to FIGS. 26A to 26d, FIGS. 27A to 27d and FIGS. 28A to 28D.

A first reference example shown in FIG. 26A indicates U-phase current when a first duty center value and a second duty center value are not shifted from an output center value. In the first reference example, since a first duty command signal is the same as a second duty command signal, the first inverter circuit 20 to be driven and controlled by the first duty command signal will be described.

Figure 26B:
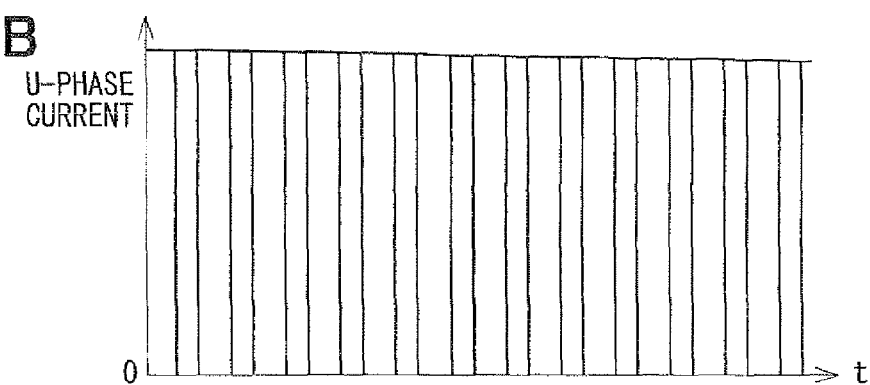

According to PWM control based on the first duty command signal and the PWM reference signal, current flowing through the U1 coil 11 has a sinusoidal wave as shown in FIG. 26A. Details of an area denoted by a symbol E3 in FIG. 26A is shown in FIG. 26B. Current flowing through the U1 low-side FET 24 is shown in FIG. 26C, and current flowing through the U1 high-side FET 21 is shown in FIG. 26D.

Figure 26C:
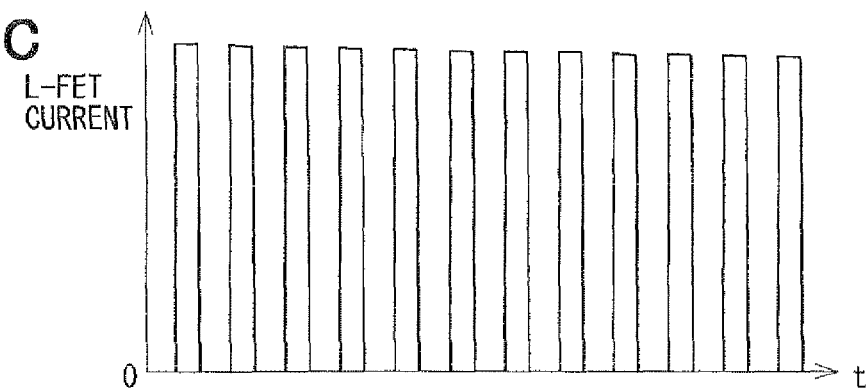
Figure 26D:
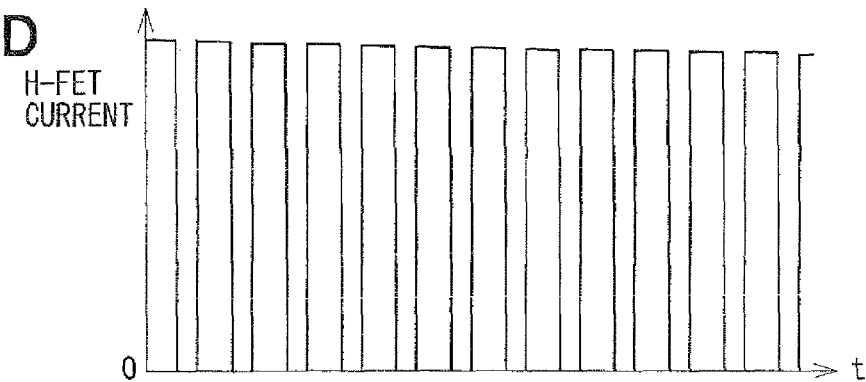

In the first reference example, since the duty command signal is not shifted, as shown in FIGS. 26B to 26D, the high-side FETs 21 to 23 have substantially the same electrical conduction times and integrated current values as the low-side FETs 24 to 26. Specifically, for one cycle of electrical angle, an integrated value of current flowing through the U1 high-side FET 21 and an integrated value of current flowing through the U1 low-side FET 24 is both 389.0 mA·sec. In this example, since the first duty center value is not shifted from the output center value, an integrated value of current flowing through the high-side FETs 21 to 23 is about equal to an integrated value of current flowing through the low-side FETs 24 to 26. Heat loss in the high-side FETs 21 to 23 is not different from heat loss in the low-side FETs 24 to 26. Likewise, since the second duty center value is not shifted from the output center value, an integrated value of current flowing through the high-side FETs 31 to 33 is about equal to an integrated value of current flowing through the low-side FETs 34 to 36. Heat loss in the high-side FETs 31 to 33 is not different from heat loss in the low-side FETs 34 to 36.

The first duty center value and the second duty center value are not shifted from the output center value R. Accordingly, generation timings of an effective voltage vector and a zero voltage vector in the first inverter circuit 20 coincide with those in the second inverter circuit 30, which results in no decrease of ripple current of the capacitor 50.

Next, a second reference example is shown in FIGS. 27A to 27D and FIGS. 28A to 28D. FIGS. 27A to 27D show U phase current of a case where the first duty command signal is shifted downwards from the output center value by 25% (−25% shift) of the possible duty range. FIGS. 28A to 28D show U phase current of a case where the second duty command signal D12 is shifted upwards from the output center value by 25% (+25% shift) of the possible duty range.

In the second reference example, since the first duty command signal is shifted downwards from the output center value and the second duty command signal is shifted upwards from the output center value, generation timings of an effective voltage vector and a zero voltage vector in the first inverter circuit 20 are deviated from those in the second inverter circuit 30, which results in decrease of ripple current of the capacitor.

Figure 27A:
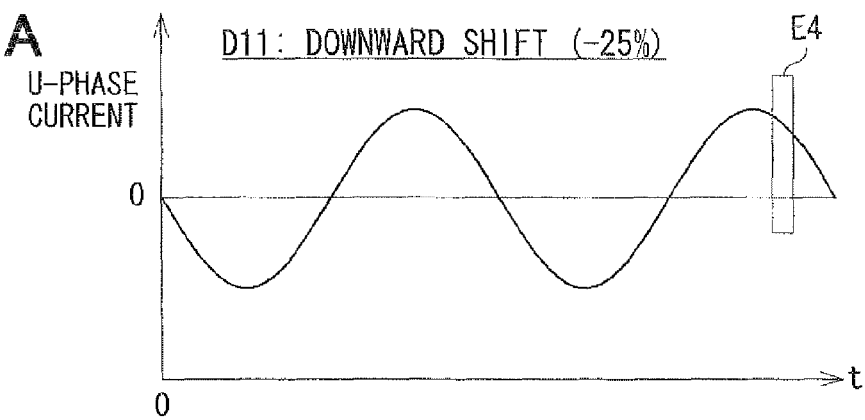
FIGS. 27A to 27D are time charts showing U-phase current of a first system in a second reference example.
Figure 28A:
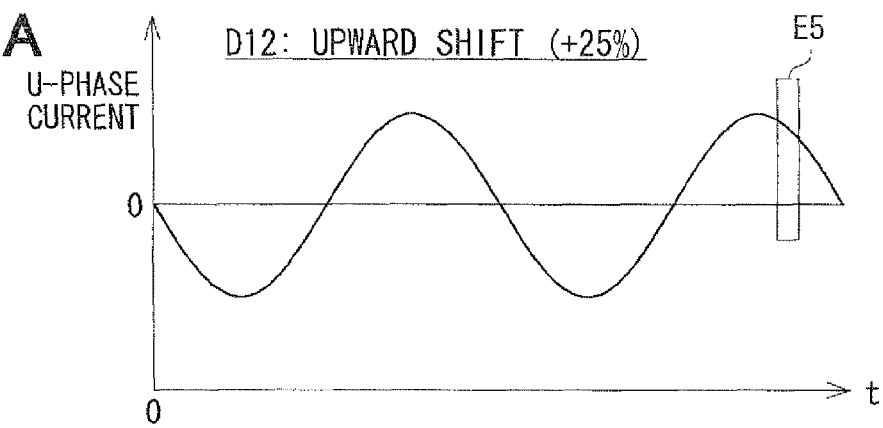
FIGS. 28A to 28D are time charts showing U-phase current of a second system in the second reference example.

As shown in FIGS. 27A and 28A, since a line voltage is not changed even when the duty command signal is shifted from the output center value, the current flowing through the U1 coil 11 and U2 coil 14 corresponds substantially to U-phase current when the duty command signal is not shifted as shown in FIG. 26A.

Figure 27B:
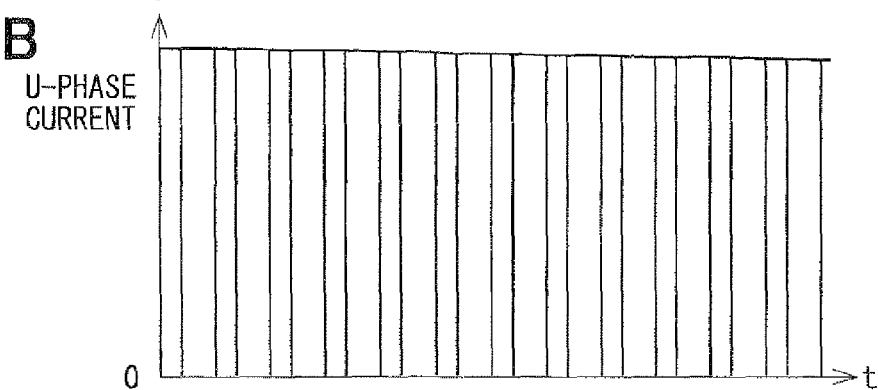

Details of an area denoted by a symbol E4 in FIG. 27A is shown in FIG. 27B. Current flowing through the U1 low-side FET 24 is shown in FIG. 27C, and current flowing through the U1 high-side FET 21 is shown in FIG. 27D.

Figure 27C:
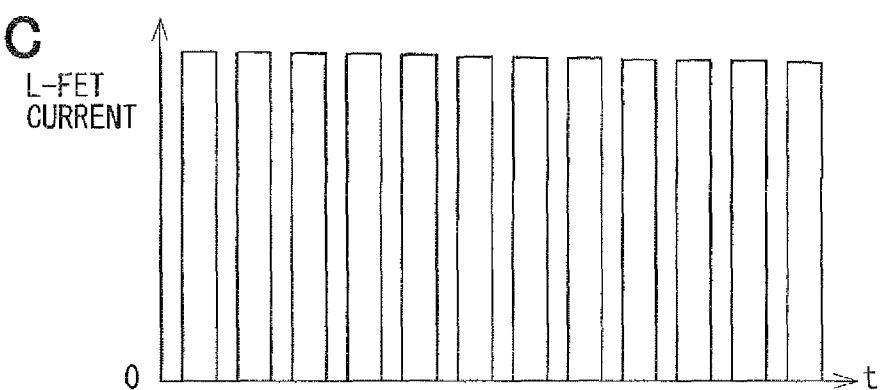
Figure 27D:
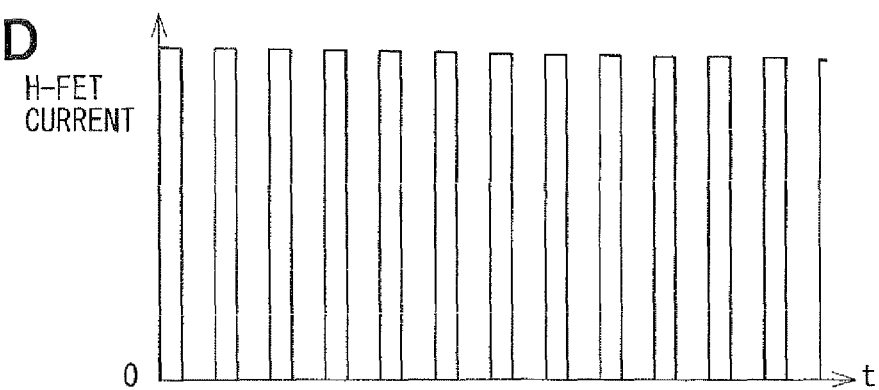

In the second reference example, since the first duty command signal D11 is shifted downwards by 25%, as shown in FIGS. 27B to 27D, electrical conduction time of the U1 low-side FET 24 is longer than that of the U1 high-side FET 21 and thus an integrated current value of the U1 low-side FET 24 is larger than that of the U1 high-side FET 21. More specifically, for one cycle of electrical angle, an integrated value of current flowing through the U1 low-side FET 24 is 583.5 mA·sec and an integrated value of current flowing through the U1 high-side FET 21 is 194.9 mA·sec. In this example, since the shift amount of the first duty center value from the output center value is large, being −25%, an integrated value of current flowing through the U1 high-side FETs 21 to 23 is greatly different from an integrated value of current flowing through the U1 low-side FETs 24 to 26. Accordingly, heat loss in the high-side FETs 21 to 23 is different from heat loss in the low-side FETs 24 to 26.

Figure 28B:
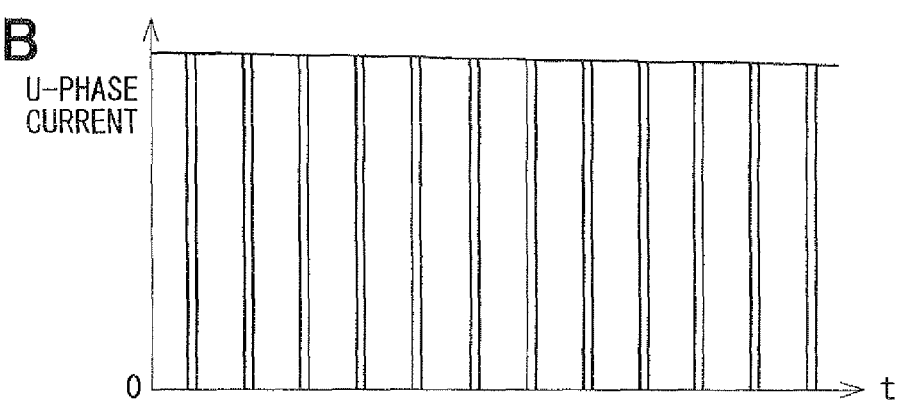

Details of an area denoted by a symbol E5 in FIG. 28A is shown in FIG. 28B. Current flowing through the U2 low-side FET 34 is shown in FIG. 28C, and current flowing through the U2 high-side FET 31 is shown in FIG. 28D.

Figure 28C:
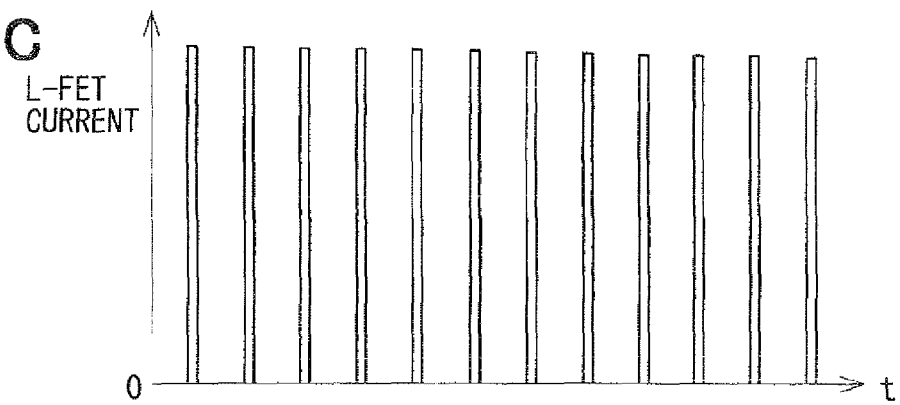
Figure 28D:
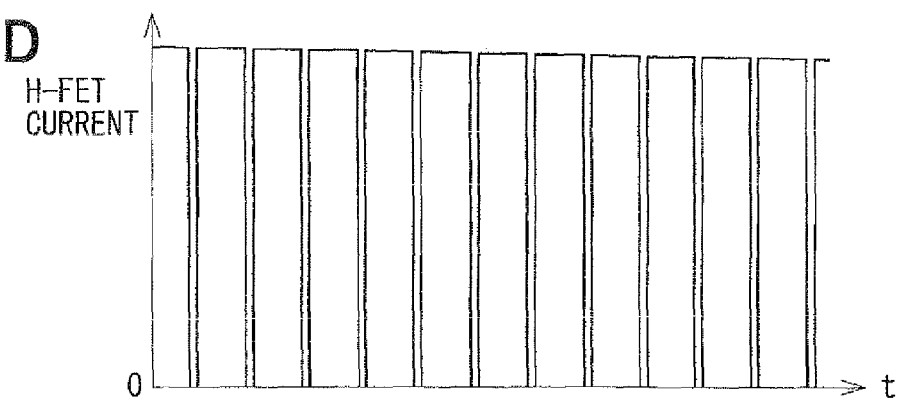

As shown in FIGS. 28B to 28D, electrical conduction time of the U2 high-side FET 31 is longer than that of the U2 low-side FET 34 and thus an integrated current value of the U2 high-side FET 31 is larger than that of the U2 low-side FET 34. More specifically, for one cycle of electrical angle, an integrated value of current flowing through the U2 high-side FET 31 is 583.9 mA·sec and an integrated value of current flowing through the U2 low-side FET 34 is 194.9 mA·sec. In this example, since the shift amount of the second duty center value from the output center value is large, being +25%, an integrated value of current flowing through the high-side FETs 31 to 33 is greatly different from an integrated value of current flowing through the low-side FETs 34 to 36. Accordingly, heat loss in the high-side FETs 31 to 33 is greatly different from heat loss in the low-side FETs 34 to 36.

On the other hand, in the first embodiment, as shown in FIGS. 10A to 10D, FIGS. 11A to 11D and FIGS. 12A to 12D, the shift amounts of the duty command signals D11 and D12 are varied depending on their amplitudes. That is, when the amplitude of each of the duty command signals D11 and D12 is small, the shift amount is set to be small. Accordingly, ripple current of the capacitor 50 is decreased and a heat loss difference is suppressed to be small by suppressing a difference in integrated current value between the FETs 21 to 26 and between the FETs 31 to 36 to be small, as compared to the second reference example.

As described in detail above, on/off switching of the FETs 21 to 26 and the FETs 31 to 36 is controlled based on the duty command signals D11 and D12 regarding the voltages applied to the sets of windings 18 and 19 and the PWM reference signal P. The shift amount M11 of the first duty center value $D_c11$ from the output center value $R_c$ is calculated such that the center value $D_c11$ of the first duty command signal D11 regarding the voltage applied to the first set of windings 18 lies in the lower part of the output center value $R_c$ of the possible duty range. In addition, the shift amount M12 of the second duty center value $D_c12$ from the output center value $R_c$ is calculated such that the center value $D_c12$ of the second duty command signal D12 regarding the voltage applied to the second set of windings 19 lies in the upper part of the output center value $R_c$. The first shift amount M11 and the second shift amount M12 vary in response to the amplitude.

In this embodiment, since the first duty command signal D11 is shifted downwards and the second duty command signal D12 is shifted upwards, charging and discharging timings of the capacitor 50 in the first inverter circuit 20 and charging and discharging timings of the capacitor 50 in the second inverter circuit 30 can be delayed to thereby decrease ripple current of the capacitor 50. In addition, in the first embodiment, the ripple current of the capacitor 50 can be decreased without providing a phase difference to the PWM reference signal regarding driving of the two inverter circuits 20 and 30. This results in reduction of a load of the control circuit 60.

In addition, since the first shift amount M11 and the second shift amount M12 are varied depending on the amplitude, ripple current of the capacitor 50 is decreased and a heat loss difference is suppressed to be small by suppressing a difference in on/off time between the high-side FETs 21 to 23 and the low-side FETs 24 to 26 and between the high-side FETs 31 to 33 and the low-side FETs 34 to 36 to be small.

In the first embodiment, the first shift amount M11 is calculated such that the maximum value $D_{max}11$ of the first duty command signal D11 corresponds to the output center value $R_c$. In addition, the second shift amount M12 is calculated such that the minimum value $D_{min}12$ of the second duty command signal D12 corresponds to the output center value $R_c$. Smaller shift amounts M11 and M12 of the center values $D_c11$ and $D_c12$ of the duty command signals D11 and D12 from the output center value $R_c$ provide a smaller difference in on-time and off-time and a smaller difference in heat loss between the high-side FETs 21 to 23 and the low-side FETs 24 to 26 and between the high-side FETs 31 to 33 and the low-side FETs 34 to 36. In the first embodiment, although the first duty command signal D11 is shifted downwards and the second duty command signal D12 is shifted upwards in order to decrease ripple current of the capacitor 50, the shift amounts M11 and M12 of the duty command signals are determined depending on their amplitude such that the duty command signals D11 and D12 are collected on the output center value $R_c$. This allows a difference in on time between the high-side FETs 21 to 23 and the low-side FETs 24 to 26 and between the high-side FETs 31 to 33 and the low-side FETs 34 to 36 to be as small as possible. This results in a smaller heat loss difference.

If the minimum value $D_{min}11$ of the first duty command signal when the maximum value $D_{max}11$ of the first duty command signal D11 is set to the output center value $R_c$ is smaller than the lower limit $R_{min}$ of the possible duty range, the first shift amount M11 is calculated such that the minimum value $D_{min}11$ of the first duty command signal D11 corresponds to the lower limit $R_{min}$ of the possible duty range. In addition, if the maximum value $D_{max}12$ of the second duty command signal D12 when the minimum value $D_{mm}12$ of the second duty command signal D12 is set to the output center value $R_c$ is larger than the upper limit $R_{max}$ of the possible duty range, the second shift amount M12 is calculated such that the maximum value $D_{max}12$ of the second duty command signal D12 corresponds to the upper limit $R_{max}$ of the possible duty range. This can prevent an output voltage from being distorted.

In the first embodiment, the output center value $R_c$ is set to 50%. Accordingly, a switching timing to switch on/off the FETs 21 to 26 and 31 to 36 in the inverter circuits 20 and 30 is uniform. This results in reduction of an operational load of the control circuit 60. In addition, the first and second duty command signals D11 and D12 are sinusoidal wave signals to facilitate PWM control.

Second Embodiment

A second embodiment of the present invention is shown in FIGS. 13, 14A, 14B and 15A to 15C.

Figure 13:
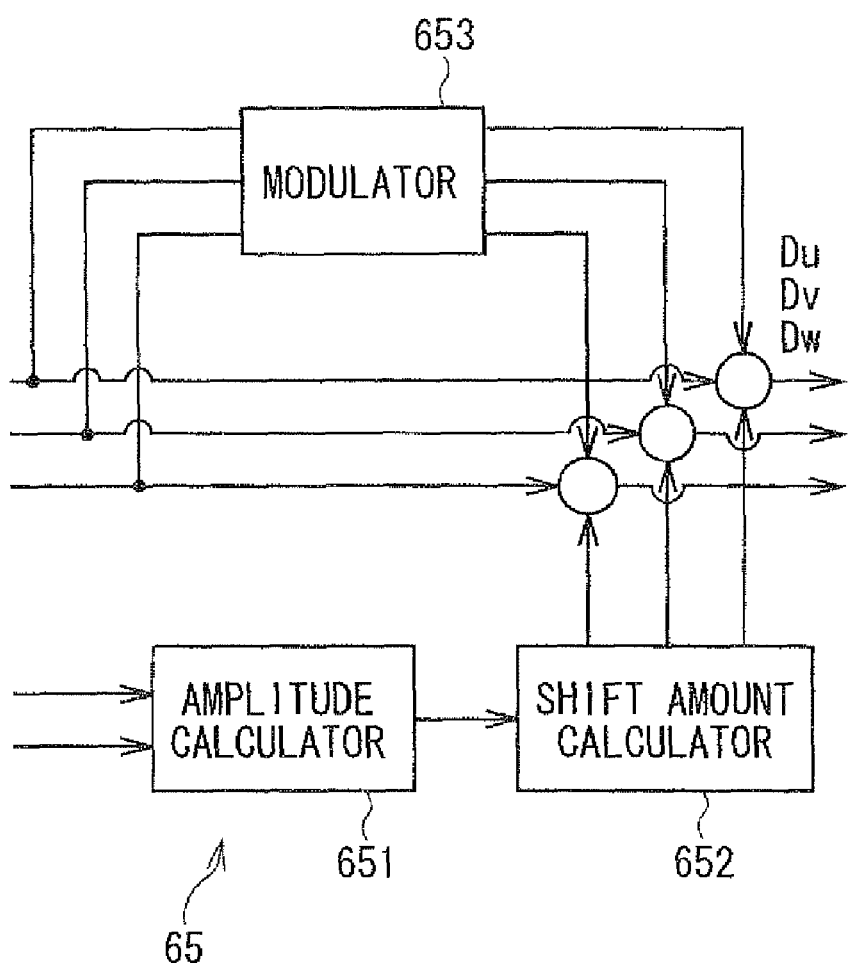
FIG. 13 is a circuit diagram showing a neutral point voltage controller according to a second embodiment of the present invention.

As shown in FIG. 13, the duty calculator 65 includes a modulator 653 in addition to the amplitude calculator 651 and the shift amount calculator 652. The modulator 653 performs a modulation process to modulate a waveform of a reference sinusoidal wave. The modulator 653 corresponds to a modulation part.

Figure 14A:
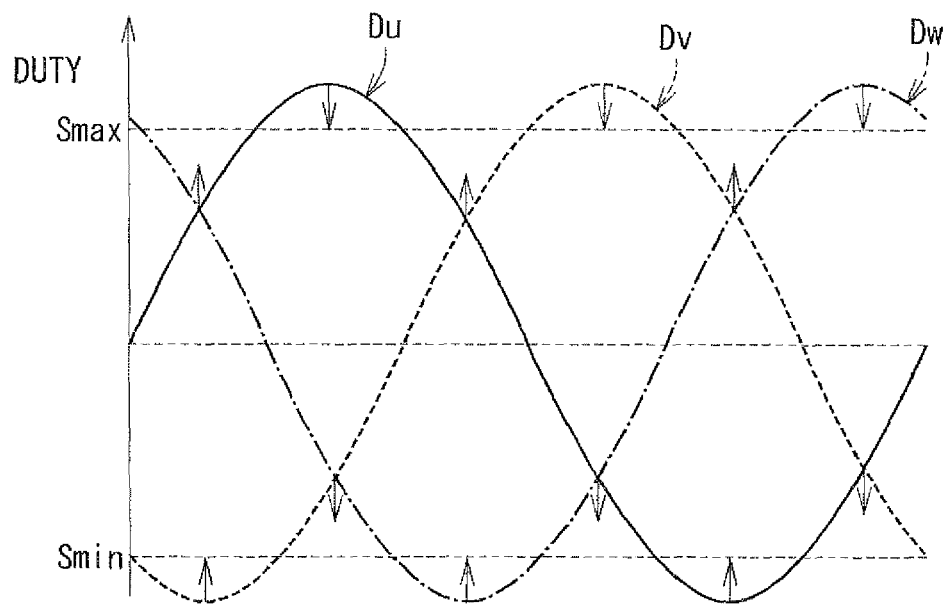
FIGS. 14A and 14B are time charts showing modulation process according to the second embodiment of the present invention.
Figure 14B:
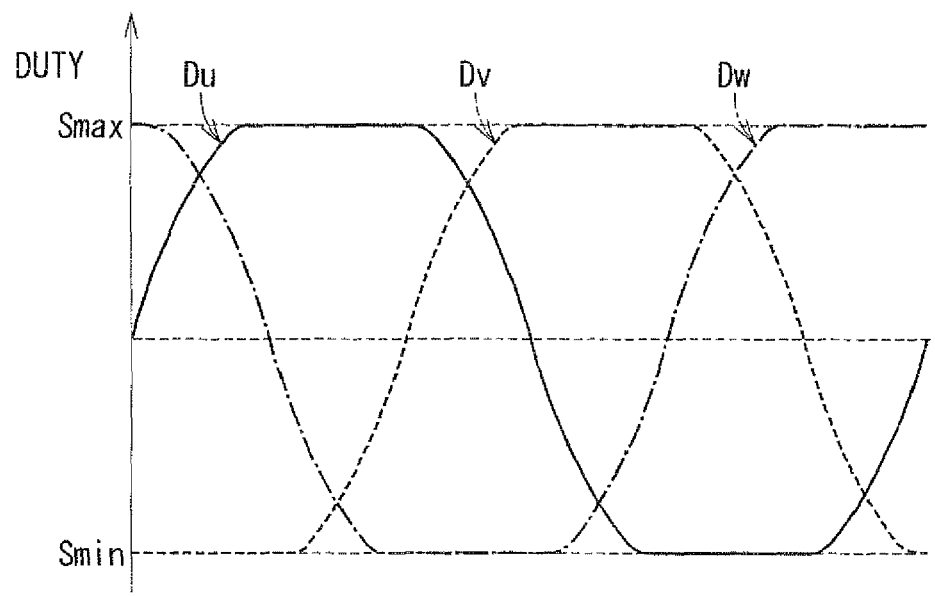

In the second embodiment, an over-duty correction process shown in FIGS. 14A and 14B is performed as the modulation process in the modulator 653. In the over-duty correction process, for a reference sinusoidal wave shown in FIG. 14A, subtraction is made from all phases by an amount exceeding the reference maximum value $S_{max}$ and the reference minimum value $S_{min}$. This results in a waveform shown in FIG. 14B after over-duty correction. In addition, in the second embodiment, the amplitude of the reference sinusoidal wave before the correction is 1.154 ($=2/\sqrt{3}$) times as large as an amplitude of a duty command signal after the correction.

In addition, a value calculated by dividing a subtraction value calculated by subtracting the minimum value of the duty command signal after modulation from the maximum value thereof by 2 is referred to amplitude of duty command signal. In addition, a voltage command signal after modulation is simply referred to as a duty command signal. The following description will be given based on the duty command signal like the first embodiment. This is equally applied to the subsequent embodiments.

In the second embodiment, like the first embodiment, ripple current of the capacitor 50 is decreased by shifting a first duty command signal D21 downwards and shifting a second duty command signal D22 upwards. In addition, a difference in heat loss between FETs is suppressed to be smaller by varying the shift amounts of the first duty command signal D21 and second duty command signal D22 depending on their amplitudes.

Specifically, as shown in FIG. 15A, if the amplitude of the first duty command signal D21 is equal to or less than 25% of the possible duty range, that is, if the minimum value $D_{min}21$ of the first duty command signal D21 when a first duty center value $D_c21$ is shifted such that the maximum value $D_{max}21$ of the first duty command signal D21 corresponds to the output center value $R_c$ is equal to or more than the lower limit $R_{min}$ of the possible duty range, the first duty center value $D_c21$ is shifted downwards such that the maximum value $D_{max}21$ of the first duty command signal D21 corresponds to the output center value $R_c$. On the other hand, if the amplitude of the second duty command signal D22 is equal to or less than 25% of the possible duty range, that is, if the maximum value $D_{max}22$ of the second duty command signal D22 when a second duty center value $D_c22$ is shifted such that the minimum value $D_{min}22$ of the second duty command signal D22 corresponds to the output center value $R_c$ is equal to or less than the upper limit $R_{max}$ of the possible duty range, the second duty center value $D_c22$ is shifted upwards such that the minimum value $D_{min}22$ of the second duty command signal D22 corresponds to the output center value $R_c$.

As shown in FIG. 15B, if the amplitude of the first duty command signal D21 is 25% of the possible duty range, when the first duty center value $D_c21$ is shifted such that the maximum value $D_{max}21$ of the first duty command signal D21 corresponds to the output center value $R_c$, the minimum value $D_{min}21$ of the first duty command signal D21 corresponds to the lower limit $R_{min}$ of the possible duty range. In addition, if the amplitude of the second duty command signal D22 is 25% of the possible duty range, when the second duty center value $D_c22$ is shifted such that the minimum value $D_{min}22$ of the second duty command signal D22 corresponds to the output center value $R_c$, the maximum value $D_{max}22$ of the second duty command signal D22 corresponds to the upper limit $R_{max}$ of the possible duty range.

As shown in FIG. 15C, if the amplitude of the first duty command signal D21 is more than 25% of the possible duty range, that is, if the maximum value $D_{max}21$ of the first duty command signal D21 when the first duty center value $D_c21$ is shifted such that the maximum value $D_{max}21$ of the first duty command signal D21 corresponds to the output center value $R_c$ is less than the lower limit $R_{min}$ of the possible duty range, the first duty center value $D_c21$ is shifted such that the minimum value $D_{min}21$ of the first duty command signal D21 corresponds to the lower limit $R_{min}$ of the possible duty range. In addition, if the amplitude of the second duty command signal D22 is more than 25% of the possible duty range, that is, if the maximum value $D_{max}22$ of the second duty command signal D22 when the second duty center value $D_c22$ is shifted such that the minimum value $D_{min}22$ of the second duty command signal D22 corresponds to the output center value $R_c$ is more than the upper limit $R_{max}$ of the possible duty range, the second duty center value $D_c22$ is shifted such that the maximum value $D_{max}22$ of the second duty command signal D22 corresponds to the upper limit $R_{max}$ of the possible duty range.

That is, if the amplitude of the first duty command signal D21 is equal to or less than 25% of the possible duty range, the first duty center value $D_c21$ is shifted downwards to be distant from the output center value $R_c$ as the amplitude increases. In addition, if the amplitude of the first duty command signal D21 is more than 25% of the possible duty range, the first duty center value $D_c21$ is shifted in a direction to be close to the output center value $R_c$.

In addition, if the amplitude of the second duty command signal D22 is equal to or less than 25% of the possible duty range, the second duty center value $D_c22$ is shifted upwards to be distant from the output center value $R_c$ as the amplitude increases. In addition, if the amplitude of the second duty command signal D22 is larger than 25% of the possible duty range, the second duty center value $D_c22$ is shifted in a direction to be close to the output center value $R_c$ as the amplitude increases.

That is, in this embodiment, the shift amount M21 of the first duty center value $D_c21$ from the output center value $R_c$ and the shift amount M22 of the second duty center value $D_c22$ from the output center value $R_c$ can be varied depending on the amplitude.

Accordingly, the second embodiment has the same advantages as the first embodiment. In addition, the over-duty correction process of subtraction from all phases by an amount exceeding the reference maximum value $S_{max}$ and the reference minimum value $S_{min}$ is performed for a reference sinusoidal wave signal, being a sinusoidal wave signal before modulation. This results in improvement of voltage use efficiency.

Third Embodiment

A third embodiment of the present invention is shown in FIGS. 16A, 16B and 17A to 17C.

In the third embodiment, like the second embodiment, the duty calculator 65 includes the modulator 653, which performs a modulation process to modulate a waveform of a reference sinusoidal wave.

Figure 16A:
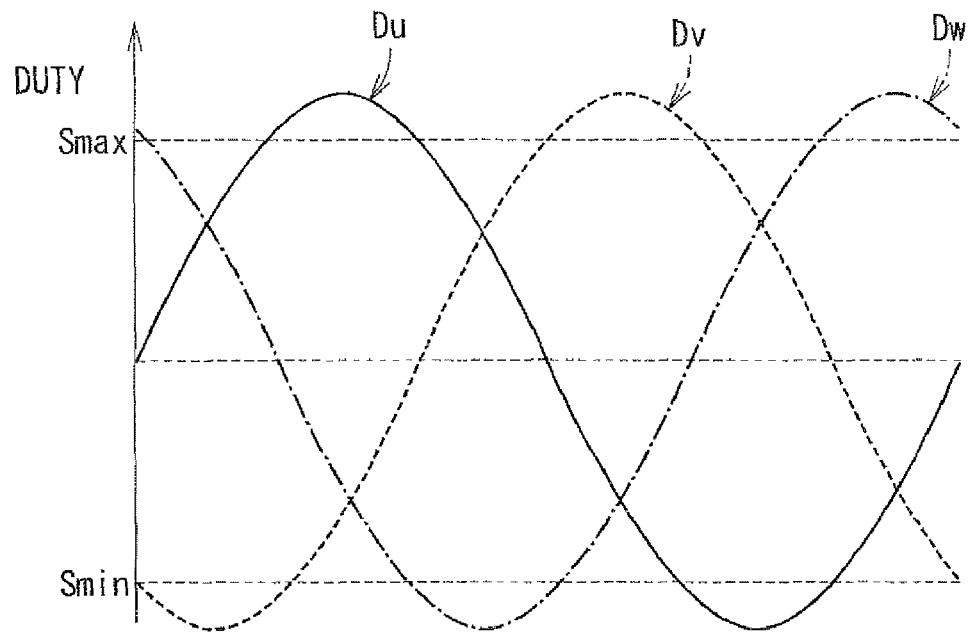
FIGS. 16A and 16B are time charts showing a modulation process according to a third embodiment of the present invention.
Figure 16B:
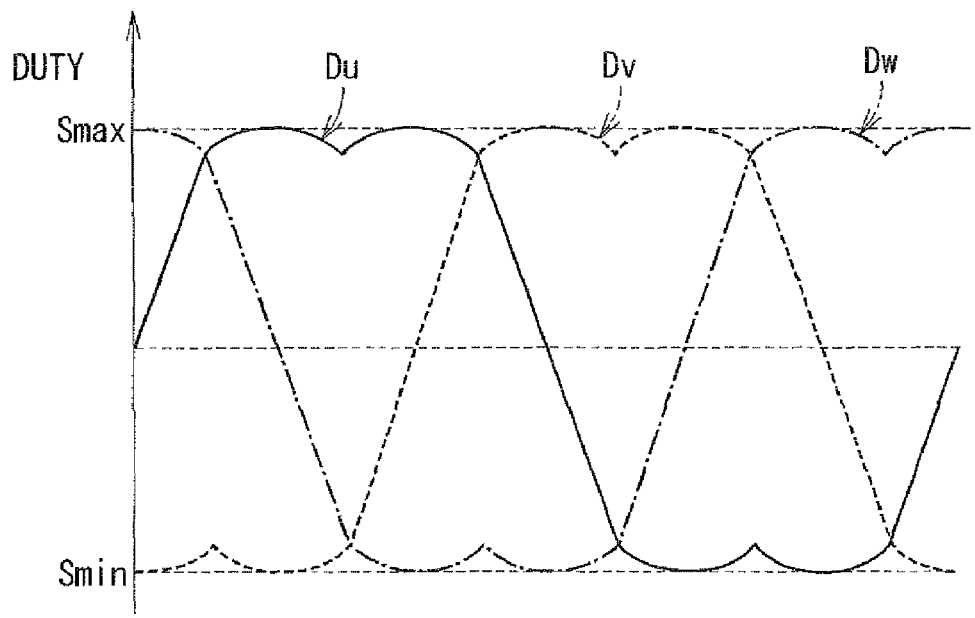

In the third embodiment, a maximum-minimum (max-min) duty equalization process shown in FIGS. 16A and 16B is performed as the modulation process in the modulator 653. In this process, a U-phase duty Du, a V-phase duty Dv and a W-phase duty Dw are calculated based on the following equations. In the following equations, Du', Dv' and Dw' are U-phase, V-phase and W-phase duties before modulation, respectively. $D_{max}$ and $D_{min}$ are the maximum value and the minimum value of duty of each phase before modulation, respectively.

$$Du = Du' - (D_{max} - D_{min})/2 \quad (1)$$

$$Dv = Dv' - (D_{max} - D_{min})/2 \quad (2)$$

$$Dw = Dw' - (D_{max} - D_{min})/2 \quad (3)$$

Waveforms of duty command signals after correction, which are calculated based on the above equations (1) to (3), are as shown in FIG. 16B.

In the third embodiment, like the first embodiment, ripple current of the capacitor 50 is decreased by shifting a first duty command signal D31 downwards and shifting a second duty command signal D32 upwards. In addition, a difference in heat loss between FETs is suppressed to be smaller by varying the shift amounts of the first duty command signal D31 and second duty command signal D32 depending on their amplitudes.

Figures 17A, 17B, 17C:
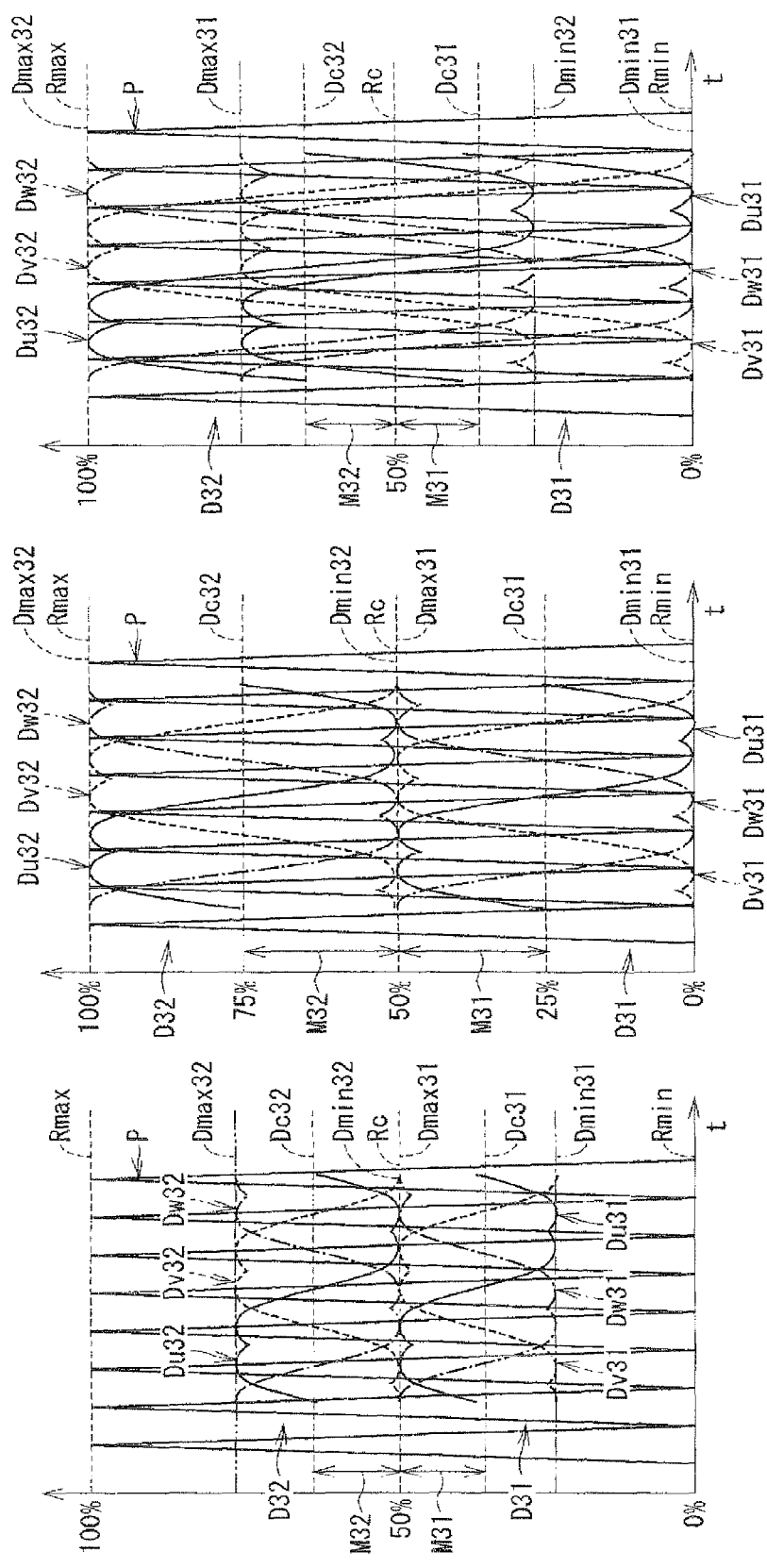
FIGS. 17A to 17C are time charts showing a duty command signal shift process according to the third embodiment of the present invention.

Specifically, as shown in FIG. 17A, if the amplitude of the first duty command signal D31 is equal to or less than 25% of the possible duty range, that is, if the minimum value $D_{min}31$ of the first duty command signal D31 when a first duty center value $D_c31$ is shifted such that the maximum value $D_{max}31$ of the first duty command signal D31 corresponds to the output center value $R_c$ is equal to or more than the lower limit $R_{min}$ of the possible duty range, the first duty center value $D_c31$ is shifted downwards such that the maximum value $D_{max}31$ of the first duty command signal D31 corresponds to the output center value $R_c$. On the other hand, if the amplitude of the second duty command signal D32 is equal to or less than 25% of the possible duty range, that is, if the maximum value $D_{max}32$ of the second duty command signal D32 when a second duty center value $D_c32$ is shifted such that the minimum value $D_{min}32$ of the second duty command signal D32 corresponds to the output center value $R_c$ is equal to or less than the upper limit $R_{max}$ of the possible duty range, the second duty center value $D_c32$ is shifted upwards such that the minimum value $D_{min}32$ of the second duty command signal D32 corresponds to the output center value $R_c$.

As shown in FIG. 17B, if the amplitude of the first duty command signal D31 is 25% of the possible duty range, when the first duty center value $D_c31$ is shifted such that the maximum value $D_{max}31$ of the first duty command signal D31 corresponds to the output center value $R_c$, the minimum value $D_{min}31$ of the first duty command signal D31 corresponds to the lower limit $R_{min}$ of the possible duty range. In addition, if the amplitude of the second duty command signal D32 is 25% of the possible duty range, when the second duty center value $D_c32$ is shifted such that the minimum value $D_{min}32$ of the second duty command signal D32 corresponds to the output center value $R_c$, the maximum value $D_{max}32$ of the second duty command signal D32 corresponds to the upper limit $R_{max}$ of the possible duty range.

As shown in FIG. 17C, if the amplitude of the first duty command signal D31 is more than 25% of the possible duty range, that is, if the minimum value $D_{min}31$ of the first duty command signal D31 when the first duty center value $D_c31$ is shifted such that the maximum value $D_{max}31$ of the first duty command signal D31 corresponds to the output center value $R_c$ is less than the lower limit $R_{min}$ of the possible duty range, the first duty center value $D_c31$ is shifted such that the minimum value $D_{min}31$ of the first duty command signal D31 corresponds to the lower limit $R_{min}$ of the possible duty range. In addition, if the amplitude of the second duty command signal D32 is more than 25% of the possible duty range, that is, if the maximum value $D_{max}32$ of the second duty command signal D32 when the second duty center value $D_c32$ is shifted such that the minimum value $D_{min}32$ of the second duty command signal D32 corresponds to the output center value $R_c$ is more than the upper limit $R_{max}$ of the possible duty range, the second duty center value $D_c32$ is shifted such that the maximum value $D_{max}32$ of the second duty command signal D32 corresponds to the upper limit $R_{max}$ of the possible duty range.

That is, if the amplitude of the first duty command signal D31 is equal to or less than 25% of the possible duty range, the first duty center value $D_c31$ is shifted downwards to be distant from the output center value $R_c$ as the amplitude increases. In addition, if the amplitude of the first duty command signal D31 is more than 25% of the possible duty range, the first duty center value $D_c31$ is shifted in a direction to be close to the output center value R.

In addition, if the amplitude of the second duty command signal D32 is equal to or less than 25% of the possible duty range, the second duty center value $D_c32$ is shifted upwards to be distant from the output center value $R_c$ as the amplitude increases. In addition, if the amplitude of the second duty command signal D32 is more than 25% of the possible duty range, the second duty center value $D_c32$ is shifted in a direction to be close to the output center value $R_c$ as the amplitude increases.

That is, in the third embodiment, the shift amount M31 of the first duty center value $D_c31$ from the output center value $R_c$ and the shift amount M32 of the second duty center value $D_c32$ from the output center value $R_c$ can be varied depending on the amplitude.

Accordingly, the third embodiment has the same advantages as the first embodiment. In addition, the Max-min duty equalization process of calculating an average value between the largest duty and the smallest duty for the sinusoidal wave signal before modulation and subtracting the average value from all phases is performed. This results in improvement of voltage use efficiency.

Fourth Embodiment

A fourth embodiment of the present invention is shown in FIGS. 18A, 18B and 19A to 19C.

In the fourth embodiment, like the second and third embodiments, the duty calculator 65 includes the modulator 653 which performs a modulation process to modulate a waveform of a reference sinusoidal wave.

Figure 18A:
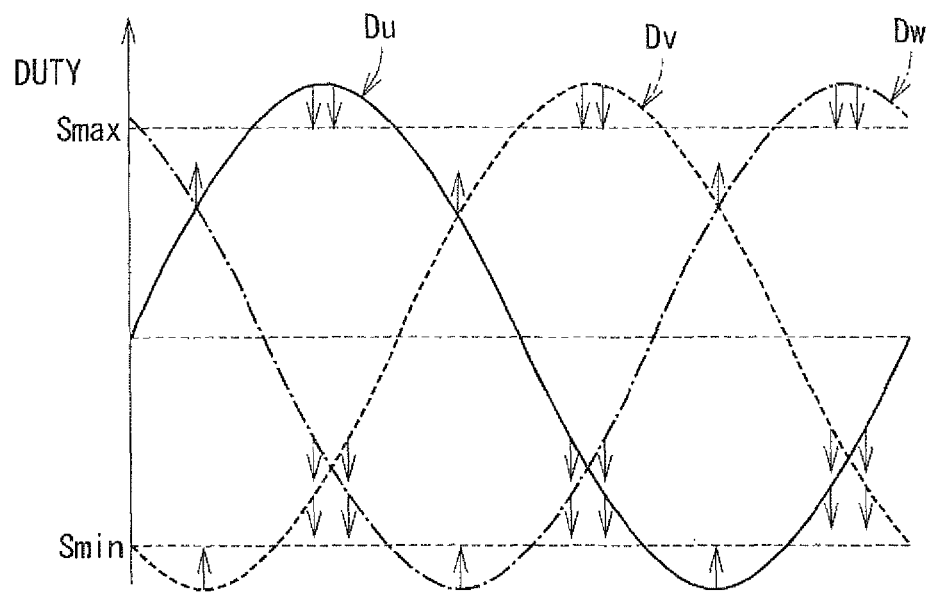
FIGS. 18A and 18B are time charts showing a modulation process according to a fourth embodiment of the present invention.
Figure 18B:
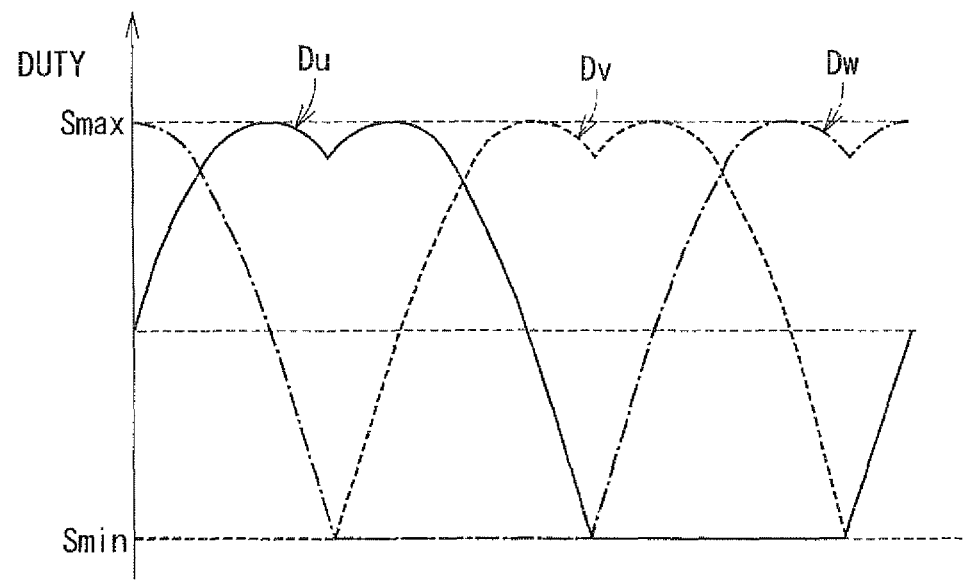

In the fourth embodiment, a lower uniform two-phase modulation process shown in FIGS. 18A and 18B is performed as the modulation process in the modulator 653. In this process, for a reference sinusoidal wave shown in FIG. 18A, a difference between a duty of the smallest phase and the reference minimum value $S_{min}$ is subtracted from all phases such that the duty of the smallest phase corresponds to the reference minimum value $S_{min}$. Waveforms after the lower uniform two-phase modulation are as shown in FIG. 18B.

In the fourth embodiment, like the first embodiment, ripple current of the capacitor 50 is decreased by shifting a first duty command signal D41 downwards and shifting a second duty command signal D42 upwards. In addition, a difference in heat loss between FETs is suppressed to be smaller by varying the shift amounts of the first duty command signal D41 and second duty command signal D42 depending on their amplitudes.

Specifically, as shown in FIG. 19A, if the amplitude of the first duty command signal D41 is equal to or less than 25% of the possible duty range, that is, if the minimum value $D_{min}41$ of the first duty command signal D41 when a first duty center value $D_c41$ is shifted such that the maximum value $D_{max}41$ of the first duty command signal D41 corresponds to the output center value $R_c$ is equal to or more than the lower limit $R_{min}$ of the possible duty range, the first duty center value $D_c41$ is shifted downwards such that the maximum value $D_{max}41$ of the first duty command signal D41 corresponds to the output center value $R_c$. On the other hand, if the amplitude of the second duty command signal D42 is equal to or less than 25% of the possible duty range, that is, if the maximum value $D_{max}42$ of the second duty command signal D42 when a second duty center value $D_c42$ is shifted such that the minimum value $D_{min}42$ of the second duty command signal D42 corresponds to the output center value $R_c$ is equal to or less than the upper limit $R_{max}$ of the possible duty range, the second duty center value $D_c42$ is shifted upwards such that the minimum value $D_{min}42$ of the second duty command signal D42 corresponds to the output center value K.

As shown in FIG. 19B, if the amplitude of the first duty command signal D41 is 25% of the possible duty range, when the first duty center value $D_c41$ is shifted such that the maximum value $D_{max}41$ of the first duty command signal D41 corresponds to the output center value $R_c$, the minimum value $D_{min}41$ of the first duty command signal D41 corresponds to the lower limit $R_{min}$ of the possible duty range. In addition, if the amplitude of the second duty command signal D42 is 25% of the possible duty range, when the second duty center value $D_c42$ is shifted such that the minimum value $D_{min}42$ of the second duty command signal D42 corresponds to the output center value $R_c$ the maximum value $D_{max}42$ of the second duty command signal D42 corresponds to the upper limit $R_{max}$ of the possible duty range.

As shown in FIG. 19C, if the amplitude of the first duty command signal D41 is more than 25% of the possible duty range, that is, if the minimum value $D_{min}41$ of the first duty command signal D41 when the first duty center value $D_c41$ is shifted such that the maximum value $D_{max}41$ of the first duty command signal D41 corresponds to the output center value $R_c$ is less than the lower limit $R_{min}$ of the possible duty range, the first duty center value $D_c41$ is shifted such that the minimum value $D_{min}41$ of the first duty command signal D41 corresponds to the lower limit $R_{min}$ of the possible duty range. In addition, if the amplitude of the second duty command signal D42 is more than 25% of the possible duty range, that is, if the maximum value $D_{max}42$ of the second duty command signal D42 when the second duty center value $D_c42$ is shifted such that the minimum value $D_{min}42$ of the second duty command signal D42 corresponds to the output center value $R_c$ is more than the upper limit $R_{max}$ of the possible duty range, the second duty center value $D_c42$ is shifted such that the maximum value $D_{max}42$ of the second duty command signal D42 corresponds to the upper limit $R_{max}$ of the possible duty range.

That is, if the amplitude of the first duty command signal D41 is equal to or less than 25% of the possible duty range, the first duty center value $D_c41$ is shifted downwards to be distant from the output center value $R_c$ as the amplitude increases. In addition, if the amplitude of the first duty command signal D41 is more than 25% of the possible duty range, the first duty center value $D_c41$ is shifted in a direction to be close to the output center value $R_c$.

In addition, if the amplitude of the second duty command signal D42 is equal to or less than 25% of the possible duty range, the second duty center value $D_c42$ is shifted upwards to be distant from the output center value $R_c$ as the amplitude increases. In addition, if the amplitude of the second duty command signal D42 is more than 25% of the possible duty range, the second duty center value $D_c42$ is shifted in a direction to be close to the output center value $R_c$ as the amplitude increases.

That is, in the fourth embodiment, the shift amount M41 of the first duty center value $D_c41$ from the output center value $R_c$ and the shift amount M42 of the second duty center value $D_c42$ from the output center value $R_c$ can be varied depending on the amplitude.

Accordingly, the fourth embodiment has the same advantages as the first embodiment. In addition, the lower uniform two-phase modulation process of subtracting a difference between a duty of the smallest phase and the reference minimum value from all phases such that the smallest duty in a sinusoidal wave signal before modulation corresponds to the reference minimum value $S_{min}$ is performed. This results in improvement of voltage use efficiency.

Fifth Embodiment

A fifth embodiment of the present invention is shown in FIGS. 20A, 20B and 21A to 21C.

In the fifth embodiment, like the second to fourth embodiments, the duty calculator 65 includes the modulator 653, which performs a modulation process to modulate a waveform of a reference sinusoidal wave.

Figure 20A:
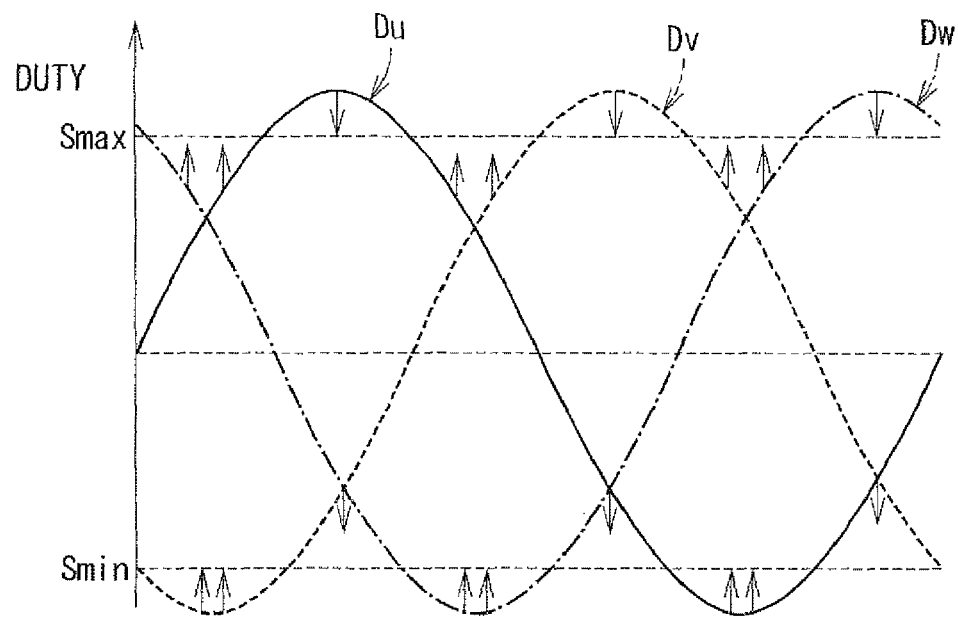
FIGS. 20A and 20B are time charts showing a modulation process according to a fifth embodiment of the present invention.
Figure 20B:
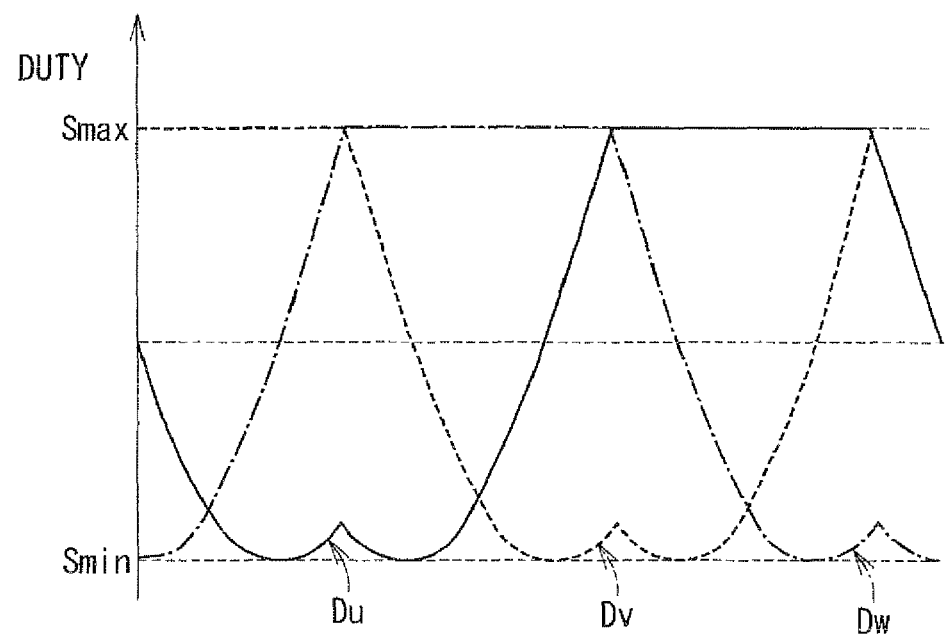

In the fourth embodiment, an upper uniform two-phase modulation process shown in FIGS. 20A and 20B is performed as the modulation process in the modulator 653. In this process, for a reference sinusoidal wave shown in FIG. 20A, a difference between a duty of the largest phase and the reference maximum value $S_{max}$ is added to all phases such that the duty of the largest phase corresponds to the reference maximum value $S_{max}$. Waveforms after the upper uniform two-phase modulation are as shown in FIG. 20B.

In the fourth embodiment, like the first embodiment, ripple current of the capacitor 50 is decreased by shifting a first duty command signal D51 downwards and shifting a second duty command signal D52 upwards. In addition, a difference in heat loss between FETs is suppressed to be smaller by varying the shift amounts of the first duty command signal D51 and second duty command signal D52 depending on their amplitudes.

Specifically, as shown in FIG. 21A, if the amplitude of the first duty command signal D51 is equal to or less than 25% of the possible duty range, that is, if the minimum value $D_{min}51$ of the first duty command signal D51 when a first duty center value $D_c51$ is shifted such that the maximum value $D_{max}51$ of the first duty command signal D51 corresponds to the output center value $R_c$ is equal to or more than the lower limit $R_{min}$ of the possible duty range, the first duty center value $D_c51$ is shifted downwards such that the maximum value $D_{max}51$ of the first duty command signal D51 corresponds to the output center value R. On the other hand, if the amplitude of the second duty command signal D52 is equal to or less than 25% of the possible duty range, that is, if the maximum value $D_{max}52$ of the second duty command signal D52 when a second duty center value $D_c52$ is shifted such that the minimum value $D_{min}52$ of the second duty command signal D52 corresponds to the output center value $R_c$ is equal to or less than the upper limit $R_{max}$ of the possible duty range, the second duty center value $D_c52$ is shifted upwards such that the minimum value $D_{min}52$ of the second duty command signal D52 corresponds to the output center value $R_c$.

As shown in FIG. 21B, if the amplitude of the first duty command signal D51 is 25% of the possible duty range, when the first duty center value $D_c51$ is shifted such that the maximum value $D_{max}51$ of the first duty command signal D51 corresponds to the output center value $R_c$, the minimum value $D_{min}51$ of the first duty command signal D51 corresponds to the lower limit $R_{min}$ of the possible duty range. In addition, if the amplitude of the second duty command signal D52 is 25% of the possible duty range, when the second duty center value $D_c52$ is shifted such that the minimum value $D_{min}52$ of the second duty command signal D52 corresponds to the output center value $R_c$, the maximum value $D_{max}52$ of the second duty command signal D52 corresponds to the upper limit $R_{max}$ of the possible duty range.

As shown in FIG. 21C, if the amplitude of the first duty command signal D51 is more than 25% of the possible duty range, that is, if the minimum value $D_{min}51$ of the first duty command signal D51 when the first duty center value $D_c51$ is shifted such that the maximum value $D_{max}51$ of the first duty command signal D51 corresponds to the output center value $R_c$ is less than the lower limit $R_{min}$ of the possible duty range, the first duty center value $D_c51$ is shifted such that the minimum value $D_{min}51$ of the first duty command signal D51 corresponds to the lower limit $R_{min}$ of the possible duty range. In addition, if the amplitude of the second duty command signal D52 is more than 25% of the possible duty range, that is, if the maximum value $D_{max}52$ of the second duty command signal D52 when the second duty center value $D_c52$ is shifted such that the minimum value $D_{min}52$ of the second duty command signal D52 corresponds to the output center value $R_c$ is more than the upper limit $R_{max}$ of the possible duty range, the second duty center value $D_c52$ is shifted such that the maximum value $D_{max}52$ of the second duty command signal D52 corresponds to the upper limit $R_{max}$ of the possible duty range.

That is, if the amplitude of the first duty command signal D51 is equal to or less than 25% of the possible duty range, the first duty center value $D_c51$ is shifted downwards to be distant from the output center value $R_c$ as the amplitude increases. In addition, if the amplitude of the first duty command signal D51 is more than 25% of the possible duty range, the first duty center value $D_c51$ is shifted in a direction to be close to the output center value $R_c$.

In addition, if the amplitude of the second duty command signal D52 is equal to or less than 25% of the possible duty range, the second duty center value $D_c52$ is shifted upwards to be distant from the output center value $R_c$ as the amplitude increases. In addition, if the amplitude of the second duty command signal D52 is more than 25% of the possible duty range, the second duty center value $D_c52$ is shifted in a direction to be close to the output center value $R_c$ as the amplitude increases.

That is, in the fifth embodiment, the shift amount M51 of the first duty center value $D_c51$ from the output center value $R_c$ and the shift amount M52 of the second duty center value $D_c52$ from the output center value $R_c$ can be varied depending on the amplitude.

Accordingly, this embodiment has the same advantages as the first embodiment. In addition, the upper uniform two-phase modulation process of adding a difference between a duty of the largest phase and the reference maximum value to all phases such that the largest duty in a sinusoidal wave signal before modulation corresponds to the reference maximum value $S_{max}$ is performed. This results in improvement of voltage use efficiency.

Sixth Embodiment

A sixth embodiment of the present invention is shown in FIGS. 22A to 22C.

In the sixth embodiment, like the second to fifth embodiments, the duty calculator 65 includes the modulator 653 which performs a modulation process to modulate a waveform of a reference sinusoidal wave.

In the sixth embodiment, as the modulation process in the modulator 653, a lower uniform two-phase modulation process shown in FIGS. 18A and 18B is performed for a command voltage to drive the first inverter circuit 20 and a upper uniform two-phase modulation process shown in FIGS. 20A and 20B is performed for a command voltage to drive the second inverter circuit 30.

In the sixth embodiment, like the first embodiment, ripple current of the capacitor 50 is decreased by shifting a first duty command signal D61 downwards and shifting a second duty command signal D62 upwards. In addition, a difference in heat loss between FETs is suppressed to be smaller by varying the shift amounts of the first duty command signal D61 and second duty command signal D62 depending on their amplitude.

Specifically, as shown in FIG. 22A, if the amplitude of the first duty command signal D61 is equal to or less than 25% of the possible duty range, that is, if the minimum value $D_{max}61$ of the first duty command signal D61 when a first duty center value $D_c61$ is shifted such that the maximum value $D_{max}61$ of the first duty command signal D61 corresponds to the output center value $R_c$ is equal to or more than the lower limit $R_{min}$ of the possible duty range, the first duty center value $D_c61$ is shifted downwards such that the maximum value $D_{max}61$ of the first duty command signal D61 corresponds to the output center value $R_c$. On the other hand, if the amplitude of the second duty command signal D62 is equal to or less than 25% of the possible duty range, that is, if the maximum value $D_{max}62$ of the second duty command signal D62 when a second duty center value $D_c62$ is shifted such that the minimum value $D_{max}62$ of the second duty command signal D62 corresponds to the output center value $R_c$ is equal to or less than the upper limit $R_{max}$ of the possible duty range, the second duty center value $D_c62$ is shifted upwards such that the minimum value $D_{min}62$ of the second duty command signal D62 corresponds to the output center value $R_c$.

As shown in FIG. 22B, if the amplitude of the first duty command signal D61 is 25% of the possible duty range, when the first duty center value $D_c61$ is shifted such that the maximum value $D_{max}61$ of the first duty command signal D61 corresponds to the output center value the minimum value $D_{min}61$ of the first duty command signal D61 corresponds to the lower limit $R_{min}$ of the possible duty range. In addition, if the amplitude of the second duty command signal D62 is 25% of the possible duty range, when the second duty center value $D_c62$ is shifted such that the minimum value $D_{min}62$ of the second duty command signal D62 corresponds to the output center value $R_c$, the maximum value $D_{max}62$ of the second duty command signal D62 corresponds to the upper limit $R_{max}$ of the possible duty range.

As shown in FIG. 22C, if the amplitude of the first duty command signal D61 is more than 25% of the possible duty range, that is, if the minimum value $D_{min}61$ of the first duty command signal D61 when the first duty center value $D_c61$ is shifted such that the maximum value $D_{max}61$ of the first duty command signal D61 corresponds to the output center value $R_c$ is less than the lower limit $R_{min}$ of the possible duty range, the first duty center value $D_c61$ is shifted such that the minimum value $D_{min}61$ of the first duty command signal D61 corresponds to the lower limit $R_c$ of the possible duty range. In addition, if the amplitude of the second duty command signal D62 is larger than 25% of the possible duty range, that is, if the maximum value $D_{max}62$ of the second duty command signal D62 when the second duty center value $D_c62$ is shifted such that the minimum value $D_{min}62$ of the second duty command signal D62 corresponds to the output center value $R_c$ is more than the upper limit $R_{max}$ of the possible duty range, the second duty center value $D_c62$ is shifted such that the maximum value $D_{max}62$ of the second duty command signal D62 corresponds to the upper limit $R_{max}$ of the possible duty range.

That is, if the amplitude of the first duty command signal D61 is equal to or less than 25% of the possible duty range, the first duty center value $D_c61$ is shifted downwards to be distant from the output center value $R_c$ as the amplitude increases. In addition, if the amplitude of the first duty command signal D61 is more than 25% of the possible duty range, the first duty center value $D_c61$ is shifted in a direction to be close to the output center value $R_c$.

In addition, if the amplitude of the second duty command signal D62 is equal to or less than 25% of the possible duty range, the second duty center value $D_c62$ is shifted upwards to be distant from the output center value $R_c$ as the amplitude increases. In addition, if the amplitude of the second duty command signal D62 is more than 25% of the possible duty range, the second duty center value $D_c62$ is shifted in a direction to be close to the output center value $R_c$ as the amplitude increases.

That is, in the sixth embodiment, the shift amount M61 of the first duty center value $D_c61$ from the output center value and the shift amount M62 of the second duty center value $D_c62$ from the output center value $R_c$ can be varied depending on the amplitude.

Accordingly, the sixth embodiment has the same advantages as the first embodiment. In addition, the lower uniform two-phase modulation process of subtracting a difference between a duty of the smallest phase and the reference minimum value $S_{min}$ from all phases such that the duty of the smallest phase in a sinusoidal wave signal before modulation corresponds to the reference minimum value $S_{min}$ is performed for the first duty command signal D61. In addition, the upper uniform two-phase modulation process of adding a difference between a duty of the largest phase and the reference maximum value $S_{max}$ to all phases such that the duty of the largest phase in a sinusoidal wave signal before modulation corresponds to the reference maximum value $S_{max}$ is performed for the second duty command signal D62. This results in improvement of voltage use efficiency.

The present invention is not limited to the above described embodiments but it is to be understood that various modifications may be made as follows without departing from the spirit and scope of the invention.

(a) Change of Shift Direction of Voltage Command Signal

While it has been illustrated in the foregoing embodiments that the first duty command signal related to the driving and control of the first inverter circuit is shifted downwards from the output center value and the second duty command signal related to the driving and control of the second inverter circuit is shifted upwards from the output center value, however, the shift direction of the voltage command signals may be inversed each other.

In addition, in a modification, the shift direction of the voltage command signal related to the driving and control of the first inverter circuit and the shift direction of the voltage command signal related to the driving and control of the second inverter circuit may be switched for each predetermined period of time.

Figure 23:
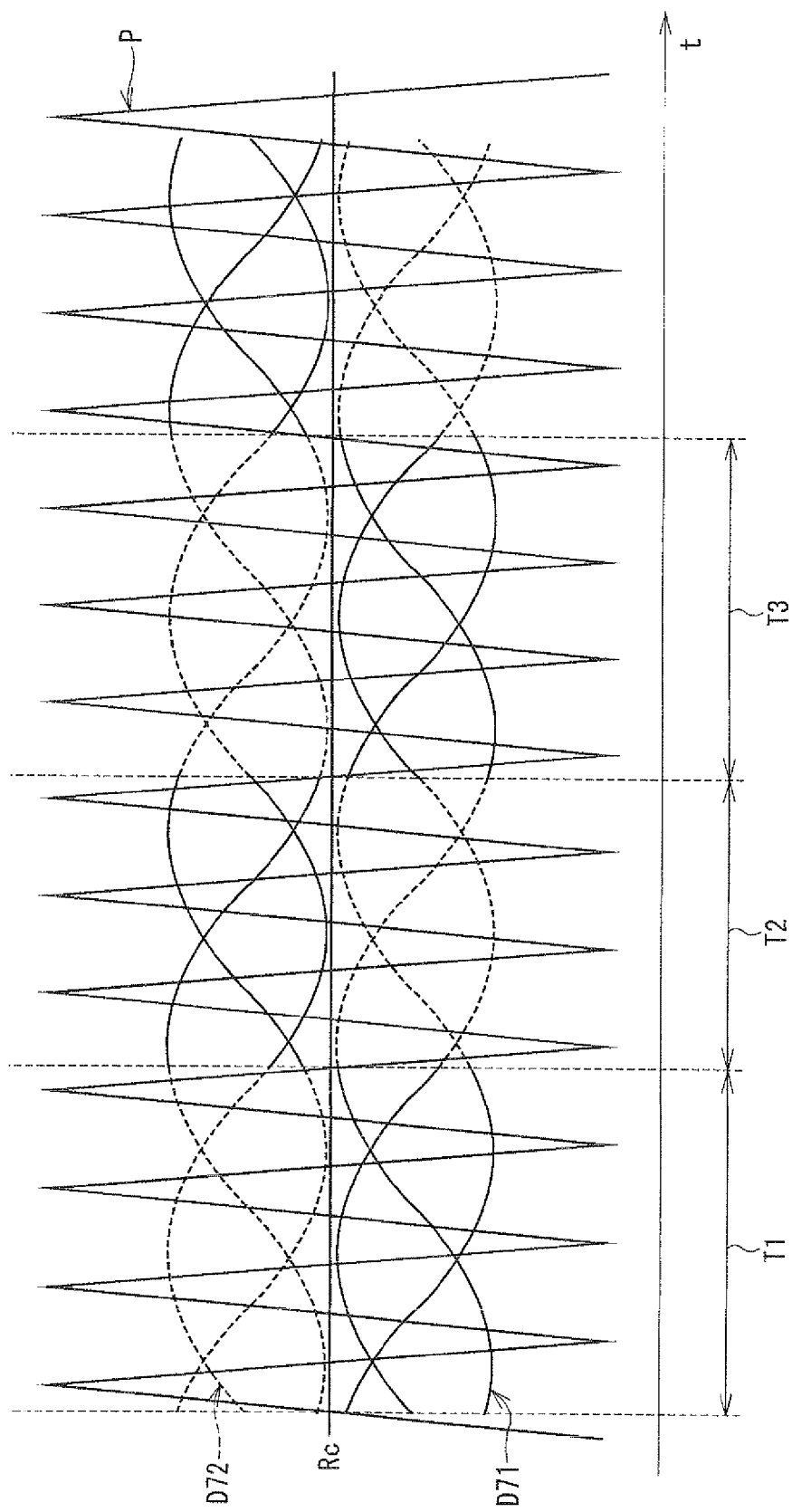
FIG. 23 is a time chart showing change of a shift direction of a duty command signal according to a modification of the present invention.

In FIG. 23, a first duty command signal D71 related to the driving and control of the first inverter circuit is indicated by a solid line and a second duty command signal D72 related to the driving and control of the second inverter circuit is indicated by a dashed line. As shown in FIG. 23, during a period of time T1, the first inverter circuit is driven and controlled by the first duty command signal D71 shifted downwards and the second inverter circuit is driven by the second duty command signal D72 shifted upwards. During a period of time T2 following the period of time T1, the first inverter circuit is driven and controlled by the first duty command signal D71 shifted upwards and the second inverter circuit is driven and controlled by the second duty command signal D72 shifted downwards. In addition, during a period of time T3 following the period of time T2, like the period of time T1, the first inverter circuit is driven and controlled by the first duty command signal D71 shifted downwards and the second inverter circuit is driven by the second duty command signal D72 shifted upwards.

In this manner, two (first and second) periods of time are alternated at predetermined intervals. During the first period of time, the first inverter circuit is driven and controlled with the center value of the first duty command signal D71 determined based on a first shift amount shifted downwards from the output center value $R_c$, and the second inverter circuit is driven and controlled with the center value of the second duty command signal D72 determined based on a second shift amount shifted upwards from the output center value $R_c$. During the second period of time, the first inverter circuit is driven and controlled with the center value of the first duty command signal D71 determined based on the second shift amount shifted upwards from the output center value $R_c$, and the second inverter circuit is driven and controlled with the center value of the second duty command signal D72 determined based on the first shift amount shifted downwards from the output center value $R_c$. This refers to changing shift directions of the duty command signals related to driving the respective inverter circuits at predetermined intervals. This allows integrated current values to be equalized and a deviation in heat loss between switching elements to be minimized by minimizing a difference in on-time between switching elements. The periods of time T1 and T3 correspond to the first period of time and the period of time T2 corresponds to the second period of time. In addition, the first inverter circuit corresponds to one inverter circuit and the second inverter circuit corresponds to the other inverter circuit. In addition, the first duty command signal D71 corresponds to a first voltage command signal and the second duty command signal D72 corresponds to a "second voltage command signal.

However, when the shift directions of the duty command signals are periodically changed as described above, noisy sound may be produced due to discontinuity of the duty command signals. For example, if the power converter is applied to an apparatus, such as an electric power steering system (EPS) or the like, a period of time during which the shift directions are changed to provide a frequency at which the sound is imperceptible may be set or a change cycle of the shift directions may be varied.

In addition, during the period of time for the change of the shift directions, based on an integrated current value of switching elements, the shift directions of the duty command signals may be changed if the integrated current value of switching elements exceeds a predetermined value. That is, the first inverter circuit is driven and controlled with the center value of the first duty command signal determined based on the first shift amount shifted downwards from the output center value $R_c$ and the second inverter circuit is driven and controlled with the center value of the second duty command signal determined based on the second shift amount shifted upwards from the output center value $R_c$. In addition, if the integrated value of current flowing through some of the switching elements exceeds a predetermined value, the first inverter circuit is driven and controlled with the center value of the first duty command signal determined based on the second shift amount shifted upwards from the output center value $R_c$ and the second inverter circuit is driven and controlled with the center value of the second duty command signal determined based on the first shift amount shifted downwards from the output center value $R_c$. This allows integrated current values to be equalized and a deviation in heat loss between switching elements to be minimized by minimizing a difference in on-time between switching elements. In addition, since a change frequency is not constant when the shift directions of the duty command signals are changed based on the integrated current value, noisy sound due to the change of the shift directions may be suppressed.

Such a change of the shift direction may be applied to any of the above described embodiments.

(b) Position of Current Detector Circuit

FIGS. 24A to 24F illustrate locations of the current detector circuit. FIGS. 24A to 24F show just the first inverter circuit 20 and the first set of windings 18 corresponding to the first inverter circuit 20 without the second inverter circuit 30 and the second set of windings 19 corresponding to the second inverter circuit 30.

Figure 24A:
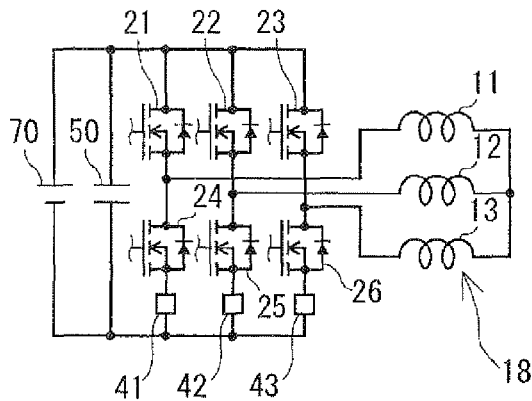
FIGS. 24A to 24F circuit diagrams showing modifications of a set location of a current detector according to an embodiment of the present invention.
Figure 24B:
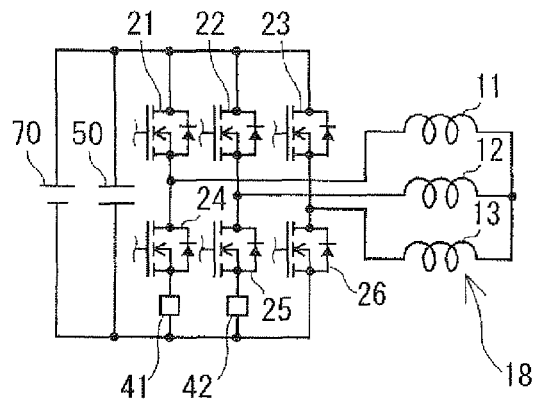

As shown in FIG. 24A, the current detectors 41 to 43 may be provided at a ground side of the low-side FETs 24 to 26. As shown in FIG. 24B, without the W1 current detector 43, the U1 current detector 41 may be provided between the U low-side FET 24 and the ground and the V1 current detector 42 may be provided between the U low-side FET 25 and the ground. As in this example, even if one of n-phase current detectors is excluded, current for all phases may be detected from a difference with power source current. For example, current of phases for two of three phase current detectors may be detected, current of phases for three of four phase current detectors may be detected, current of phases for four of five phase current detectors may be detected, etc. In addition, any phase for the current detectors may be excluded.

Figure 24C:
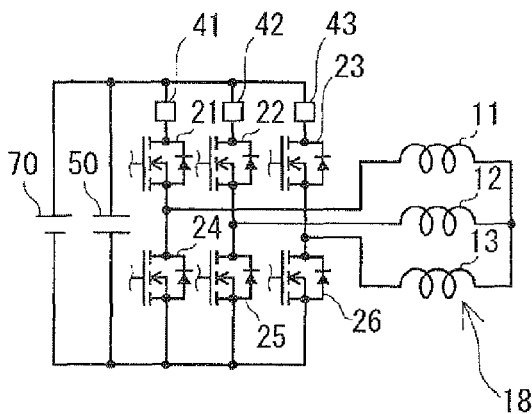

As shown in FIG. 24C, the current detectors 41 to 43 may be provided at a power source side of the high-side FETs 21 to 23. As shown in FIG. 24O, the W1 current detector 43 may be excluded in the example of FIG. 24C. The exclusion of one of n-phase current detectors is as illustrated in FIG. 24B.

Figure 24D:
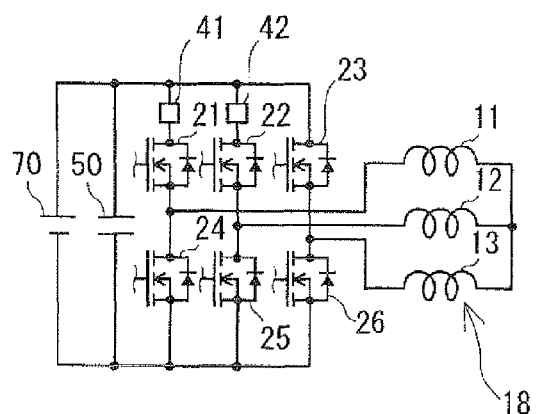
Figure 24E:
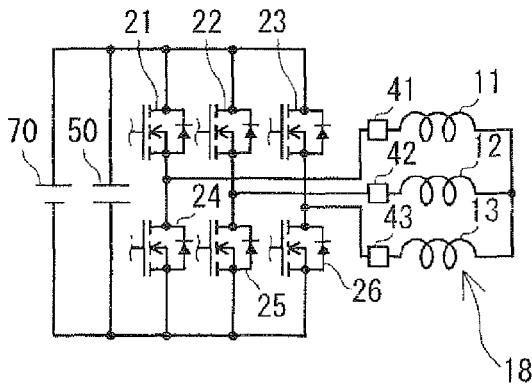
Figure 24F:
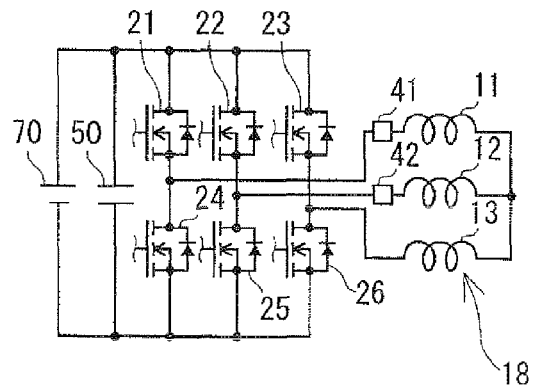

As shown in FIG. 24E, the current detectors 41 to 43 may be provided between respective nodes between the high-side FETs 21 to 23 and the low-side FETs 24 to 26 and corresponding windings 11 to 13. As shown in FIG. 24F, the W1 current detector 43 may be excluded in the example of FIG. 24E. The exclusion of one of n-phase current detectors is as illustrated in FIG. 24B.

(c) Type of Current Detector Circuit

If a current detector circuit is provided at the locations shown in FIGS. 24E and 24F, a Hall element is preferably used as a current detector. If a current detector circuit is provided at the locations shown in FIGS. 24A to 24D, the Hall element may be replaced with a shunt resistor as a current detector.

Figure 4B:
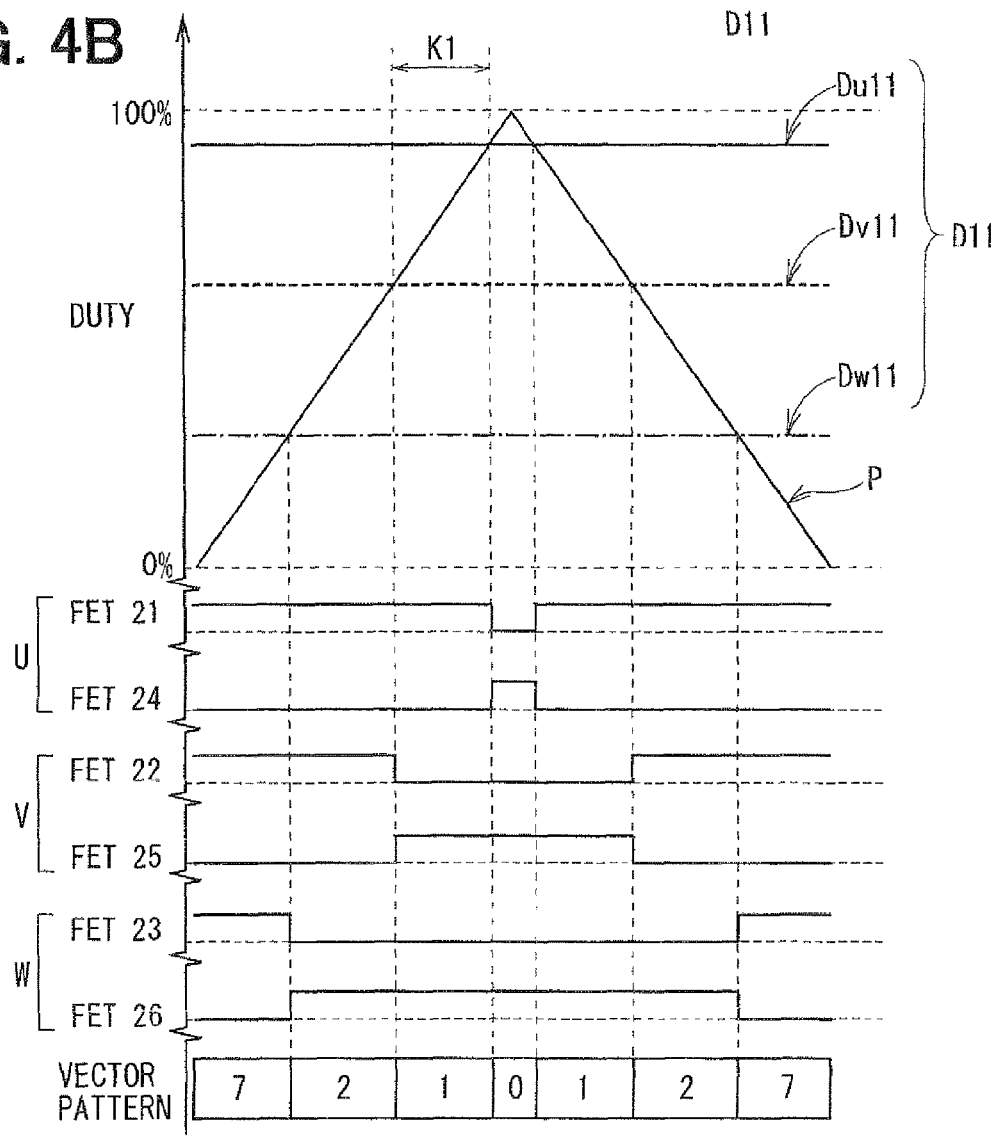

If a shunt resistor is provided, as a current detector, at the location shown in FIG. 24A or 24B, for example for a mountain side of the PWM reference signal shown in FIGS. 4A and 4B, since current flowing through the current detectors 41 to 43 when all of the low-side FETs 24 to 26 are turned on (referred to as mountain side current) is equal to current flowing through the set of windings 18, the mountain side current is detected as winding current. On the other hand, for a valley side of the PWM reference signal, current flowing through the current detectors 41 to 43 when all of the low-side FETs 24 to 26 are turned off (referred to as valley side current) is used for correction of the winding current based on variation of temperature of a shunt resistor or an amplification circuit.

That is, if a shunt resistor is used as the current detector, for the mountain and valley sides of the PWM reference signal, it is necessary to secure a period of time during which all of the low-side FETs 24 to 26 are turned on or a period of time during which all of the low-side FETs 24 to 26 are turned off. In addition, if current is detected by a shunt resistor, it is necessary to secure rigging convergence time (for example, 4.5 μsec), i.e., hold time for which no on/off switching of FETs is performed. Accordingly, for the current detector circuit, an possible duty range may be determined based on time taken to detect current.

In addition, if it is not necessary to correct winding current, only the upper limit of the possible duty range may be determined based on time taken to detect current in the current detector circuit.

In addition, if a shunt resistor is provided, as a current detector, at the location shown in FIG. 24C or 24D, for the valley side of the PWM reference signal, since the valley side current flowing through the current detectors 41 to 43 when all of the high-side FETs 21 to 23 are turned on is equal to the current flowing through the set of windings 18, the valley side current is detected as the winding current. In this case, if it is not necessary to correct winding current, only the lower limit of the possible duty range may be determined based on time taken to detect current in the current detector circuit.

Accordingly, current flowing through the set of windings from the current detector circuit can be properly detected.

In addition, it is necessary that a bootstrap type gate driver circuit turns on all of the low-side FETs 24 to 26 for each predetermined cycle. This does not allow the upper limit of the possible duty range to be set to 100%. Accordingly, the upper limit of the possible duty range may be determined based on a configuration of a gate driver circuit.

(d) Other Modifications

Figure 25A:
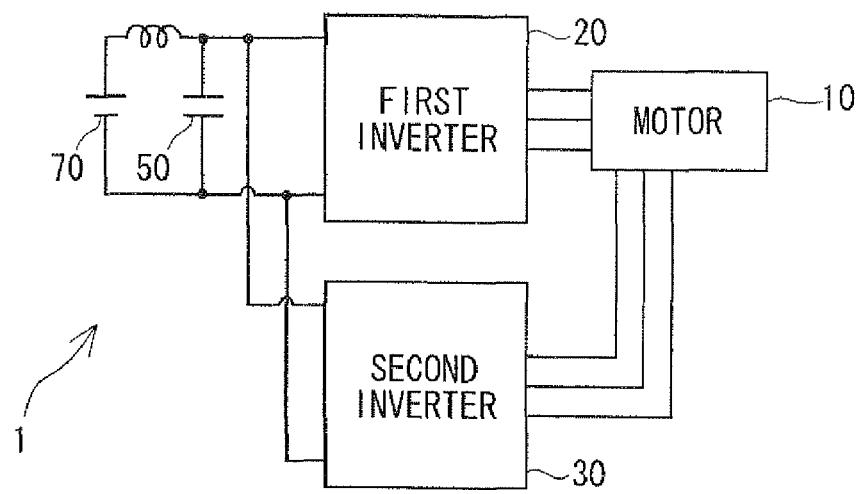
FIGS. 25A and 25B are circuit diagrams showing a case where a plurality of rotating electric machines is present according to a modification of the present invention.
Figure 25B:
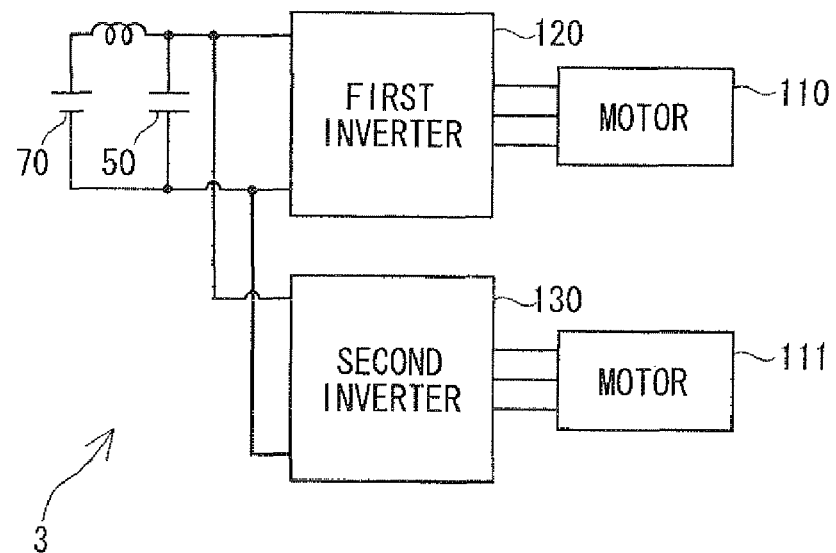

While it has been illustrated in the foregoing embodiments that two lines of inverter circuits drive one motor 10, as schematically shown in FIG. 25A, the two lines of inverter circuits may be configured to drive different motors, respectively, as schematically shown in FIG. 25B. For example, a first inverter circuit 120 may drive a first motor 110 while a second inverter circuit 130 may drive a second motor 111.

Although it has been illustrated in the foregoing embodiments that all of the multiphase rotating electric machines are motors, they are not limited thereto but may be electric generators. Moreover, the multiphase rotating electric machines are not limited to EPSs but may be used for many different applications other than EPS including, for example, power windows and so on.

What is claimed is:

1. A power converter for a multiphase rotating electric machine, which includes two sets of windings, each set being constituted by windings corresponding to each phase of the electric machine, the power converter comprising:
   two inverter circuits, each having switching elements corresponding to each phase of the sets of windings;
   a capacitor connected to the inverter circuits; and
   a control circuit, which controls switching-on/off of the switching elements based on voltage command signals related to voltages applied to the sets of windings and a PWM reference signal,
   wherein the control circuit includes:
   an amplitude calculating part for calculating amplitudes of the voltage command signals; and
   a shift amount calculating part for calculating a first shift amount and a second shift amount, the first shift amount indicating a shift amount of a center value of the voltage command signal related to a voltage applied to one of the sets of windings from an output center value of a possible duty range to allow the center value of the voltage command signal to be shifted downwards than the output center value, and the second shift amount indicating a shift amount of a center value of the voltage command signal related to a voltage applied to the other of the sets of windings from the output center value to allow the center value of the voltage command signal to be shifted upwards from the output center value, and wherein the first shift amount and the second shift amount are varied depending on the amplitudes calculated by the amplitude calculating part.

2. The power converter according to claim 1, wherein:
   the shift amount calculating part calculates the first shift amount to allow a maximum value of the voltage command signal shifted downwards from the output center value to correspond to the output center value.

3. The power converter according to claim 2, wherein:
   the shift amount calculating part calculates the first shift amount to allow a minimum value of the voltage command signal to correspond to a lower limit of the possible duty range, if the minimum value of the voltage command signal, which is provided when the maximum value of the voltage command signal shifted downwards corresponds to the output center value, is smaller than the lower limit of the possible duty range.

4. The power converter according to claim 1, wherein:
   the shift amount calculating part calculates the second shift amount to allow a minimum value of the voltage command signal shifted upwards from the output center value to correspond to the output center value.

5. The power converter according to claim 4, wherein:
   the shift amount calculating part calculates the second shift amount to allow a maximum value of the voltage command signal to correspond to an upper limit of the possible duty range, if the maximum value of the voltage command signal, which is provided when the minimum value of the voltage command signal shifted upwards corresponds to the output center value, is larger than the upper limit of the possible duty range.

6. The power converter according to claim 1, wherein:
   the output center value is 50%.

7. The power converter according to claim 1, further comprising:
   current detector circuits provided to detect currents flowing through the sets of windings, respectively,
   wherein at least one of upper and lower limits of the possible duty range is determined based on time taken to detect the currents in the current detector circuits.

8. The power converter according to claim 1, wherein:
   the control circuit is configured to:
   drive and control one of the inverter circuits with the center value of a first voltage command signal, which is the voltage command signal applied to the one set of windings, determined based on the first shift amount, and drive and control the other of the inverter circuits with the center value of a second voltage command signal, which is the voltage command signal applied to the other set of windings, determined based on the second shift amount; and
   drive and control the one of the inverter circuits with the center value of the first voltage command signal determined based on the second shift amount, and drive and control the other of the inverter circuits with the center value of the second voltage command signal determined based on the first shift amount, if an integrated value of current flowing through any one of the switching elements exceeds a predetermined value.

9. The power converter according to claim 1, wherein:
   the control circuit is configured to alternate between a first period of time during which one of the inverter circuits is driven and controlled with the center value of the first voltage command signal, which is the voltage command signal applied to the one set of windings, determined based on the first shift amount, and the other of the inverter circuits is driven and controlled with the center value of the second voltage command signal, which is the voltage command signal applied to the other set of windings, determined based on the second shift amount and a second period of time during which the one of the inverter circuits is driven and controlled with the center value of the first voltage command signal determined based on the second shift amount and the other of inverter circuits is driven and controlled with the center value of the second voltage command signal determined based on the first shift amount.

10. The power converter according to claim 1, wherein:
the voltage command signal is a sinusoidal wave signal.

11. The power converter according to claim 1, wherein:
the control circuit includes a modulation part for modulating the voltage command signal from a sinusoidal wave signal.

12. The power converter according to claim 11, wherein:
the modulation part subtracts an amount exceeding a reference maximum value and a reference minimum value from all phases for a sinusoidal wave signal before modulation.

13. The power converter according to claim 11, wherein:
the modulation part calculates an average value between a largest duty and a smallest duty for the sinusoidal wave signal and subtracts the average value from all phases.

14. The power converter according to claim 11, wherein:
the modulation part subtracts a difference between a duty of a smallest duty phase and a reference minimum value from all phases such that the smallest duty in the sinusoidal wave signal before modulation corresponds to the reference minimum value.

15. The power converter according to claim 11, wherein:
the modulation part adds a difference between a duty of a largest duty phase and a reference maximum value to all phases such that the largest duty in the sinusoidal wave signal before modulation corresponds to the reference maximum value.

16. The power converter according to claim 11, wherein:
the modulation part is configured to:
subtract a difference between a duty of a smallest duty phase and a reference minimum value from all phases such that the duty of the smallest duty phase in the sinusoidal wave signal before modulation corresponds to the reference minimum value for the voltage command signal shifted downwards from the output center value; and
add a difference between a duty of a largest duty phase and a reference maximum value to all phases such that the duty of the largest duty phase in the sinusoidal wave signal before modulation corresponds to the reference maximum value for the voltage command signal shifted upwards from the output center value.

* * * * *